US010041387B2

(12) United States Patent
Nakata et al.

(10) Patent No.: US 10,041,387 B2
(45) Date of Patent: Aug. 7, 2018

(54) EXHAUST DEVICE STRUCTURE FOR ROCKING VEHICLE

(71) Applicant: HONDA MOTOR CO., LTD., Tokyo (JP)

(72) Inventors: Masato Nakata, Wako (JP); Yuzuru Ishikawa, Wako (JP); Toru Ukawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/386,429

(22) Filed: Dec. 21, 2016

(65) Prior Publication Data

US 2017/0183994 A1 Jun. 29, 2017

(30) Foreign Application Priority Data

Dec. 25, 2015 (JP) ................................ 2015-252914
Dec. 25, 2015 (JP) ................................ 2015-252916

(51) Int. Cl.
*B62D 61/02* (2006.01)
*F01N 1/08* (2006.01)
(Continued)

(52) U.S. Cl.
CPC .............. *F01N 1/089* (2013.01); *B62M 7/02* (2013.01); *F01N 1/003* (2013.01); *F01N 1/163* (2013.01);
(Continued)

(58) Field of Classification Search
CPC ................................ F01N 1/089; B62M 7/02
(Continued)

(56) References Cited

U.S. PATENT DOCUMENTS 4,354,349 A * 10/1982 Otani .................... F01N 1/089 181/232
4,359,126 A * 11/1982 Aiba .................... B62K 11/00 180/219
(Continued)

FOREIGN PATENT DOCUMENTS

CA 2794236 A1 4/2014
EP 1921286 A1 5/2008
(Continued)

OTHER PUBLICATIONS

European Patent Office, "Communication with Extended European Search Report," issued in connection with European Patent Application No. 16205713.7, dated Apr. 5, 2017.
(Continued)

*Primary Examiner* — Joseph M Rocca
*Assistant Examiner* — Conan D Duda
(74) *Attorney, Agent, or Firm* — Birch, Stewart, Kolasch & Birch, LLP

(57) ABSTRACT

An exhaust device structure for a rocking vehicle includes: a front side exhaust device and a rear side exhaust device muffling exhaust gas noise from an engine; the front side exhaust device and the rear side exhaust device including a front side exhaust pipe and a rear side exhaust pipe having upstream ends connected to exhaust ports of the engine and a first muffler and a second muffler connected to downstream ends of the front side exhaust pipe and the rear side exhaust pipe, the first muffler and the second muffler being disposed on a lower side of the vehicle, the first muffler and the second muffler being arranged to be separated from each other in a forward-rearward direction of the vehicle, and the first muffler and the second muffler being arranged so as to be separated from each other in a left-right direction with respect to a vehicle center.

15 Claims, 14 Drawing Sheets

(51) Int. Cl.

| | |
|---|---|
| ***B62M 7/02*** | (2006.01) |
| ***F01N 3/10*** | (2006.01) |
| ***F01N 13/00*** | (2010.01) |
| ***F01N 13/10*** | (2010.01) |
| ***F02B 61/02*** | (2006.01) |
| ***F02B 75/22*** | (2006.01) |
| ***F01N 13/02*** | (2010.01) |
| ***F01N 1/00*** | (2006.01) |
| ***F01N 1/16*** | (2006.01) |

(52) U.S. Cl.
CPC ............. *F01N 3/10* (2013.01); *F01N 13/008* (2013.01); *F01N 13/02* (2013.01); *F01N 13/10* (2013.01); *F02B 61/02* (2013.01); *F02B 75/22* (2013.01); *F01N 2240/36* (2013.01); *F01N 2340/04* (2013.01); *F01N 2470/14* (2013.01); *F01N 2490/02* (2013.01); *F01N 2590/04* (2013.01)

(58) Field of Classification Search
USPC .......................................................... 180/219
See application file for complete search history.

(56) References Cited

U.S. PATENT DOCUMENTS

| | | | | |
|---|---|---|---|---|
| 4,860,538 A * | 8/1989 | Takeuchi | F02B 27/06 | 180/219 |
| 6,193,004 B1 * | 2/2001 | Cooksey | B62K 11/04 | 180/219 |
| 6,334,501 B1 * | 1/2002 | Kawamoto | B60K 13/04 | 180/219 |
| 6,804,955 B2 * | 10/2004 | Bassani | F01N 13/04 | 180/296 |
| 7,699,134 B2 * | 4/2010 | Terashima | F01N 13/011 | 180/219 |
| 2006/0242952 A1 * | 11/2006 | Muramatsu | F01N 1/003 | 60/299 |
| 2007/0107419 A1 * | 5/2007 | Taniguchi | F01N 1/084 | 60/299 |
| 2008/0110693 A1 * | 5/2008 | Muto | F01N 1/003 | 181/250 |
| 2008/0236152 A1 * | 10/2008 | Morita | F01N 3/10 | 60/324 |
| 2009/0114477 A1 * | 5/2009 | Nishijima | F01N 1/084 | 181/272 |
| 2010/0212990 A1 * | 8/2010 | Terashima | F01N 1/02 | 180/296 |
| 2011/0127098 A1 * | 6/2011 | Tsutsui | B62K 11/04 | 180/219 |
| 2014/0290232 A1 * | 10/2014 | Koyanagi | F01N 13/10 | 60/323 |
| 2014/0361512 A1 * | 12/2014 | Ishida | B62K 25/20 | 280/284 |
| 2015/0267586 A1 * | 9/2015 | Smith | F01N 3/2882 | 60/299 |

FOREIGN PATENT DOCUMENTS

| | | | |
|---|---|---|---|
| EP | 1975382 A2 | | 10/2008 |
| EP | 2784275 A1 | | 10/2014 |
| JP | 2-271024 A | | 11/1990 |
| JP | 2007091132 A | * | 4/2007 |
| JP | 2007-118900 A | | 5/2007 |

OTHER PUBLICATIONS

European Office Action, dated Feb. 15, 2018, for European Application No. 16205713.7.

* cited by examiner 78a
78
85
79
72
77
113
77b
80
76a
C
76d
76c
76
77a
82c
82
102d
76b
115
103
102b
103b
101
103a
104
104a
83
75
103d
100
104d
74f
111
105
112
112c
106b
74d
106
73d
74e
106c
106a
106d
74b
71
74c
70
74
74a
73b
73a
73
73c
114
102e
102f
102
102a
LH
FR 78a
78
72
85
79
82c
77
76d
76c
76
76b
77a
82
102d
104b
103b
101
103a
103
104
103c
104c
113
115
83
102
111
112
112c
114
102a
UP
FR
73a
73b
71
70
74c
74
73
73c
VIII
VIII 80
76a
76d
76c
C
76
82
102d
77
77a
77c
84
113
76b
115
101
81
103d
102b
75
104d
102c
83
74f
102a
111
105
102
112b
112a
106b
73d
102f
106
102e
110
74d
106c
74e
106d
106a
70
71
74
74c
73
73c
LH
FR UP
FR
106d
74
70
73
71
106c
114
74e
106
41
74d
44
106b
87
73d
112b
112c
112
112a
10
74f
105
111
101
73e
104d
103d
18
60
17
59
113
61
20
77
20a
76d
79
85
30
77b
72
3
78
30a 20a
20
30b
30
12
102
102b
82a
76c
82
76
82b
30c
58a
58
61
58c
60
C
59
31
61
76d
80
30a
101
3
77
72
113
104c
103c
79
20
78
20a
UP
LH

EXHAUST DEVICE STRUCTURE FOR ROCKING VEHICLE

INCORPORATION BY REFERENCE

The present application claims priority under 35 U.S.C. § 119 to Japanese Patent Application No. 2015-252914 filed on Dec. 25, 2015 and Japanese Patent Application No. 2015-252916 filed on Dec. 25, 2015. The content of the applications is incorporated herein by reference in its entirety.

TECHNICAL FIELD

The present invention relates to an exhaust device structure for a rocking vehicle.

BACKGROUND ART

In a conventionally known exhaust device structure for a rocking vehicle, the exhaust device structure including exhaust pipes and expansion chambers arranged below an internal combustion engine, the plurality of expansion chambers provided so as to be aligned in a forward-rearward direction are arranged in such a manner as to straddle a center in a vehicle width direction and overlap each other in the vehicle width direction (see for example Patent Document 1).

PRIOR ART DOCUMENT

Patent Document

[Patent Document 1]
Japanese Patent Laid-Open No. 2007-118900

SUMMARY OF THE INVENTION

Problems to be Solved by the Invention

When the plurality of expansion chambers are aligned in the forward-rearward direction as in the above-described conventional exhaust device structure, the expansion chambers can be arranged by making effective use of a front space and a rear space. However, depending on a layout of parts of the vehicle, the expansion chambers may need to be arranged so as to be offset in the vehicle width direction. In this case, a weight imbalance in the vehicle width direction of the vehicle occurs. It is desirable to improve the weight balance of a rocking vehicle whose vehicle body rocks and banks, in particular.

The present invention has been made in view of the above-described circumstances. It is an object of the present invention to be able to improve a left-right vehicle weight balance in an exhaust device structure for a rocking vehicle.

Means for Solving the Problems

In order to achieve the above object, according to the present invention, there is provided an exhaust device structure for a rocking vehicle, the exhaust device structure including: an internal combustion engine (10) mounted between a front wheel (2) and a rear wheel (3); and an exhaust device (70, 100) that muffles exhaust gas noise from the internal combustion engine (10); the exhaust device (70, 100) including an exhaust pipe (71, 101) having an upstream end connected to an exhaust port (52L, 52R, 53L, 53R) of the internal combustion engine (10) and an expansion chamber (72, 102) connected to a downstream end of the exhaust pipe (71, 101), the expansion chamber (72, 102) being disposed on a lower side of the vehicle, and the expansion chamber (72, 102) including a plurality of expansion chambers (72, 102) separated from each other in a forward-rearward direction of the vehicle, and the plurality of expansion chambers (72, 102) being arranged so as to be separated from each other in a left-right direction with respect to a vehicle center (C).

According to the present invention, the exhaust device that muffles the exhaust gas noise from the internal combustion engine includes the exhaust pipe having the upstream end connected to the exhaust port of the internal combustion engine and the expansion chamber connected to the downstream end of the exhaust pipe, the expansion chamber is disposed on the lower side of the vehicle, the expansion chamber includes the plurality of expansion chambers separated from each other in the forward-rearward direction of the vehicle, and the plurality of expansion chambers are arranged so as to be separated from each other in the left-right direction with respect to the vehicle center. Thus, because the plurality of expansion chambers are separated from each other in the forward-rearward direction of the vehicle, and are arranged so as to be separated from each other in the left-right direction with respect to the vehicle center, the expansion chambers can be arranged by making effective use of a front space and a rear space, and a left-right weight balance of the vehicle can be improved even in the constitution in which the expansion chambers are arranged so as to be offset in a vehicle width direction.

In addition, in the present invention, the exhaust pipe (71, 101) of the exhaust device (70, 100) is formed by a plurality of exhaust pipes (71, 101) independent of each other, and the plurality of the expansion chambers (72, 102) are mufflers arranged separately for the plurality of the exhaust pipes (71, 101) independent of each other.

According to the present invention, the exhaust pipe of the exhaust device is formed by the plurality of exhaust pipes independent of each other, and the plurality of expansion chambers are mufflers arranged separately for the plurality of exhaust pipes independent of each other. Thus, because the exhaust pipes are independent of each other, the mufflers are easily arranged so as to be separated from each other in the left-right direction with respect to the vehicle center. In addition, because the expansion chambers are the mufflers that are heavy in weight, the left-right weight balance can be improved effectively by arranging the mufflers so as to be separated from each other in the left-right direction.

In addition, in the present invention, a front side muffler (102) disposed on a front side in the forward-rearward direction of the vehicle is disposed below the internal combustion engine (10), and a rear side muffler (72) disposed on a rear side in the forward-rearward direction of the vehicle is disposed below a swing arm (30) by which the rear wheel (3) is swingably supported from a vehicle body frame (F).

According to the present invention, because the front side muffler is disposed below the internal combustion engine, and the rear side muffler is disposed below the swing arm by which the rear wheel is swingably supported from the vehicle body frame, the front side muffler and the rear side muffler can be arranged so as to be separated from each other longitudinally and laterally by making effective use of a space below the internal combustion engine and a space below the swing arm.

Further, in the present invention, the front side muffler (102) disposed below the internal combustion engine (10) is disposed on an other side so as to avoid an oil pan (44) that bulges from a lower portion of the internal combustion engine (10), and the exhaust pipe (71) of the rear side muffler (72) is disposed so as to pass on one side of the oil pan (44), and a side surface of the front side muffler (102), the side surface being on a side of the oil pan (44), has a curved surface portion (102*f*) along a side surface of a bulging portion (87) of the oil pan (44).

According to the present invention, the front side muffler disposed below the internal combustion engine is disposed on the other side so as to avoid the oil pan that bulges from the lower portion of the internal combustion engine, the exhaust pipe of the rear side muffler is disposed so as to pass on the one side of the oil pan, and the side surface of the front side muffler which side surface is on the oil pan side has the curved surface portion along the side surface of the bulging portion of the oil pan. It is thus possible to divide a space below the internal combustion engine into spaces for arranging the front side muffler on the other side of the oil pan and the exhaust pipe on the one side of the oil pan, and increase the capacity of the front side muffler. In addition, because the front side muffler has the curved surface portion along the side surface of the bulging portion of the oil pan, the capacity of the front side muffler can be increased.

In addition, in the present invention, an exhaust valve (112) that controls opening and closing of an exhaust pipe passage of the exhaust pipe (101) is disposed in the exhaust pipe (101) located in front of the rear side muffler (72) and below the internal combustion engine (10), and a driving pulley portion (112*c*) that drives the exhaust valve (112) is disposed on an exhaust pipe side surface facing the internal combustion engine (10).

According to the present invention, the exhaust valve that controls the opening and closing of the exhaust pipe passage of the exhaust pipe is disposed in the exhaust pipe located in front of the rear side muffler and below the internal combustion engine, and the driving pulley portion that drives the exhaust valve is disposed on the exhaust pipe side surface facing the internal combustion engine. Thus, the driving pulley portion can be disposed outward and downward compactly, and a clearance between the exhaust valve and a road surface can be secured.

In addition, in the present invention, the internal combustion engine (10) is a V-type internal combustion engine in which cylinder portions (42, 43) forming a pair are arranged so as to be longitudinally aligned with each other in a V-shape, and the front side muffler (102) and the rear side muffler (72) are arranged separately for the plurality of the exhaust pipes (71, 101) connected to the respective cylinder portions (42, 43) independently of each other.

According to the present invention, the internal combustion engine is the V-type internal combustion engine in which the cylinder portions forming a pair are arranged so as to be longitudinally aligned with each other in a V-shape, and the front side muffler and the rear side muffler are arranged separately for the plurality of exhaust pipes connected to the respective cylinder portions independently of each other. Thus, because the plurality of exhaust pipes are connected to the respective cylinder portions of the V-type internal combustion engine independently of each other, there is a high degree of freedom of arrangement of the exhaust pipes, and the mufflers provided for the exhaust pipes are easily arranged so as to be separated from each other in the left-right direction with respect to the vehicle center. In addition, the front side muffler and the rear side muffler can be efficiently arranged apart from each other longitudinally so as to correspond to the positions of the cylinder portions that are aligned with each other longitudinally.

In addition, in the present invention, the V-type internal combustion engine (10) has a plurality of parallel cylinders in one cylinder portion (42), and a collecting portion (75) into which a plurality of exhaust pipes (73, 74) included in the exhaust pipe (71) and extending from the respective cylinders merge is disposed below the V-type internal combustion engine (10), near to an opposite side of the oil pan (44) from the front side muffler (102), and in front of the rear side muffler (72).

According to the present invention, the V-type internal combustion engine has the plurality of parallel cylinders in one cylinder portion, and the collecting portion into which the plurality of exhaust pipes included in the exhaust pipe and extending from the respective cylinders merge is disposed below the V-type internal combustion engine, near to the opposite side of the oil pan from the front side muffler, and in front of the rear side muffler. Thus, the collecting portion of the exhaust pipe can be disposed below the V-type internal combustion engine and in positions different from those of the front side muffler and the rear side muffler, and the exhaust pipe can be disposed by making effective use of a space below the V-type internal combustion engine.

Further, in the present invention, the V-type internal combustion engine (10) has a plurality of parallel cylinders in each of the cylinder portions (42, 43), collecting portions (75, 105) into which a plurality of exhaust pipes (73, 74, 103, 104) included in the exhaust pipes (71, 101) and extending from the respective cylinders merge are disposed for the respective cylinder portions (42, 43), and the exhaust pipes (71, 101) extending from the respective cylinder portions (42, 43) extend in directions counter to each other below the V-type internal combustion engine (10), and the collecting portions (75, 105) are arranged so as to be longitudinally displaced from each other below the V-type internal combustion engine (10) and do not overlap each other longitudinally.

According to the present invention, the V-type internal combustion engine has the plurality of parallel cylinders in each of the cylinder portions, the collecting portions into which the plurality of exhaust pipes included in the exhaust pipes and extending from the respective cylinders merge are disposed for the respective cylinder portions, the exhaust pipes extending from the respective cylinder portions extend in the directions counter to each other below the V-type internal combustion engine, and the collecting portions are arranged so as to be longitudinally displaced from each other below the V-type internal combustion engine and do not overlap each other longitudinally. Thus, the collecting portions of the plurality of exhaust pipes extended from the respective cylinder portions can be arranged compactly in a space below the V-type internal combustion engine.

In addition, in the present invention, a vehicle body frame (F) in which the internal combustion engine (10) is mounted and a suspension device (12) that swingably supports the rear wheel (3) are provided, and one of the plurality of the expansion chambers (72, 102) is a muffler (72), the suspension device (12) includes a swing arm (30) that swingably supports the rear wheel (3) and a cushion device (31) that cushions swinging of the swing arm (30), the muffler (72) is disposed below the swing arm (30) and on one side of the cushion device (31), and the exhaust pipe (71) extends from a front side of the muffler (72), bends so as to pass in a rear of the cushion device (31) from an other side of the cushion device (31), and is connected to the muffler (72).

According to the present invention, the muffler is disposed below the swing arm and on the one side of the cushion device, and the exhaust pipe extends from the front side of the muffler, bends so as to pass in the rear of the cushion device from the other side of the cushion device, and is connected to the muffler. Thus, because the muffler is disposed below the swing arm and on the one side of the cushion device, a clearance between the muffler and the cushion device of the suspension device can be secured. Further, because the muffler can be disposed in a low position of the vehicle body and on a central side in the vehicle width direction, a clearance between the muffler and the road surface can be secured even when the rocking vehicle banks. In addition, because the exhaust pipe extends from the front side of the muffler, bends so as to pass in the rear of the cushion device from the other side of the cushion device, and is connected to the muffler, an exhaust pipe length from the exhaust port to the muffler can be lengthened.

In addition, in the present invention, the cushion device (31) includes a suspension (58) and a link mechanism (59) that is connected to the suspension (58) and located below an undersurface of the swing arm (30), and the muffler (72) is disposed on a side of the link mechanism (59).

According to the present invention, the muffler is disposed on the side of the link mechanism of the cushion device. The link mechanism in the cushion device is a part that is not easily susceptible to heat. The muffler can thus be disposed close to the link mechanism. Therefore, the muffler can be disposed compactly.

In addition, the link mechanism (59) is disposed so as to be inclined in an oblique direction as viewed from a side, and the exhaust pipe (71) passes below an upper end side of link arms (61) of the link mechanism (59) and is connected to the muffler (72).

According to the present invention, the link mechanism is disposed so as to be inclined in an oblique direction as viewed from the side, and the exhaust pipe passes below the upper end side of the link arms of the link mechanism and is connected to the muffler. It is therefore possible to dispose the exhaust pipe compactly in the forward-rearward direction by making effective use of a space below the link mechanism.

Further, in the present invention, the exhaust pipe (71) includes a rear bent portion (76*c*) that bends so as to pass in the rear of the cushion device (31) from the other side of the cushion device (31) and a linear portion (76*d*) that linearly extends in the left-right direction of the vehicle from an end of the rear bent portion (76*c*), and a catalytic device (80) is disposed within the linear portion (76*d*).

According to the present invention, the exhaust pipe includes the rear bent portion that bends so as to pass in the rear of the cushion device from the other side of the cushion device and the linear portion that linearly extends in the left-right direction of the vehicle from the end of the rear bent portion, and the catalytic device is disposed within the linear portion. Thus, the catalytic device can be disposed by using the linear portion passing in the rear of the cushion device, and there is no need to provide a linear pipe for disposing the catalytic device in the forward-rearward direction. A longitudinal length of the exhaust pipe can therefore be made compact.

In addition, in the present invention, the exhaust pipe (71) has an exhaust gas sensor (81), and the exhaust gas sensor (81) is disposed immediately in front of the cushion device (31).

According to the present invention, because the exhaust gas sensor of the exhaust pipe is disposed immediately in front of the cushion device, the exhaust gas sensor can be disposed compactly by using a space below the swing arm and in front of the cushion device.

In addition, in the present invention, the exhaust pipe (71) has an exhaust valve (82) that controls opening and closing of an exhaust pipe passage of the exhaust pipe (71), the exhaust valve (82) being disposed in the exhaust pipe (71) and in a position on a side of the link mechanism (59), and a driving shaft (82*b*) as a center of rotation of the exhaust valve (82) is disposed so as to be along a direction of an axis (58*c*) of the cushion device (31) as viewed from a front.

According to the present invention, the exhaust pipe has the exhaust valve that controls the opening and closing of the exhaust pipe passage of the exhaust pipe, the exhaust valve being disposed in the exhaust pipe and in the position on the side of the link mechanism, and the driving shaft as the center of rotation of the exhaust valve is disposed so as to be along the axial direction of the cushion device as viewed from the front. Therefore, the exhaust valve can be made compact in the vehicle width direction, and the exhaust valve can be disposed compactly in the position on the side of the link mechanism.

In addition, in the present invention, the exhaust pipe (71) includes a rear bent portion (76*c*) that bends so as to pass in the rear of the cushion device (31) from the other side of the cushion device (31) and a linear portion (76*d*) that linearly extends in the left-right direction of the vehicle from an end of the rear bent portion (76*c*), and a catalytic device (80) is disposed within the linear portion (76*d*), the exhaust pipe (71) has an exhaust gas sensor (81), and the exhaust gas sensor (81) is disposed immediately in front of the cushion device (31), the exhaust pipe (71) has an exhaust valve (82) that controls opening and closing of an exhaust pipe passage of the exhaust pipe (71), the exhaust valve (82) being disposed in the exhaust pipe (71) and in a position on a side of the link mechanism (59), and a driving shaft (82*b*) as a center of rotation of the exhaust valve (82) is disposed so as to be along a direction of an axis (58*c*) of the cushion device (31) as viewed from a front, as viewed from a vehicle bottom portion of the rocking vehicle, the exhaust pipe (71) is wound around a periphery of the cushion device (31) so as to surround the cushion device (31) with the exhaust gas sensor (81), the linear portion (76*d*), and the exhaust valve (82), and a side on the one side of the cushion device (31) is covered by the muffler (72).

According to the present invention, as viewed from the vehicle bottom portion, the exhaust pipe is wound around the periphery of the cushion device so as to surround the cushion device with the exhaust gas sensor, the linear portion, and the exhaust valve, and the side on the one side of the cushion device is covered by the muffler. Thus, the exhaust gas sensor, the linear portion, the exhaust valve, and the muffler can be disposed compactly so as to surround the periphery of the cushion device.

Further, in the present invention, as viewed from a side of the vehicle, a top surface (77*b*) of the muffler (72) is inclined such that a rear portion of the top surface (77*b*) is lower than a front portion of the top surface (77*b*) in accordance with a swinging angle of the swing arm (30).

According to the present invention, as viewed from the side of the vehicle, the top surface of the muffler is inclined such that the rear portion of the top surface is lower than the front portion of the top surface in accordance with the swinging angle of the swing arm. It is therefore possible to dispose the muffler compactly while securing the swinging angle of the swing arm.

Effects of the Invention

In the exhaust device structure for a rocking vehicle according to the present invention, the expansion chambers can be arranged by making effective use of a front space and a rear space, and a left-right weight balance of the vehicle can be improved even in the constitution in which the expansion chambers are arranged so as to be offset in the vehicle width direction.

In addition, because the exhaust pipes are independent of each other, the mufflers are easily arranged so as to be separated from each other in the left-right direction with respect to the vehicle center.

In addition, the front side muffler and the rear side muffler can be arranged so as to be separated from each other longitudinally and laterally by making effective use of a space below the internal combustion engine and a space below the swing arm.

Further, the capacity of the front side muffler can be increased.

In addition, a clearance between the exhaust valve and the road surface can be secured.

In addition, there is a high degree of freedom of arrangement of the exhaust pipes, and the mufflers provided for the exhaust pipes are easily arranged so as to be separated from each other in the left-right direction with respect to the vehicle center.

In addition, the collecting portion of the exhaust pipe can be disposed compactly.

In addition, the collecting portions of the plurality of exhaust pipes extended from the respective cylinder portions can be arranged compactly.

In addition, an exhaust pipe length from the exhaust port to the muffler can be secured, and clearances of the muffler from the road surface and the suspension device can be secured.

In addition, the muffler can be compactly disposed close to the link mechanism.

In addition, the exhaust pipe can be disposed compactly in the forward-rearward direction by making effective use of a space below the link mechanism.

In addition, the exhaust gas sensor can be disposed compactly by using a space in front of the cushion device.

Further, the exhaust valve can be disposed compactly in the position on the side of the link mechanism.

In addition, the exhaust gas sensor, the linear portion, the exhaust valve, and the muffler can be disposed compactly so as to surround the periphery of the cushion device.

In addition, the muffler can be disposed compactly while a swinging angle of the swing arm is secured.

MODE FOR CARRYING OUT THE INVENTION

An embodiment of the present invention will hereinafter be described with reference to the drawings. It is to be noted that, in the description, directions such as front and rear, left and right, and up and down are the same as directions with respect to a vehicle body unless otherwise specified. In addition, symbol FR shown in the respective figures indicates a forward direction of the vehicle body, symbol UP indicates an upward direction of the vehicle body, and symbol LH indicates a leftward direction of the vehicle body. In addition, in the figures, a rightward direction of the vehicle body may be indicated by symbol RH.

Figure 1:
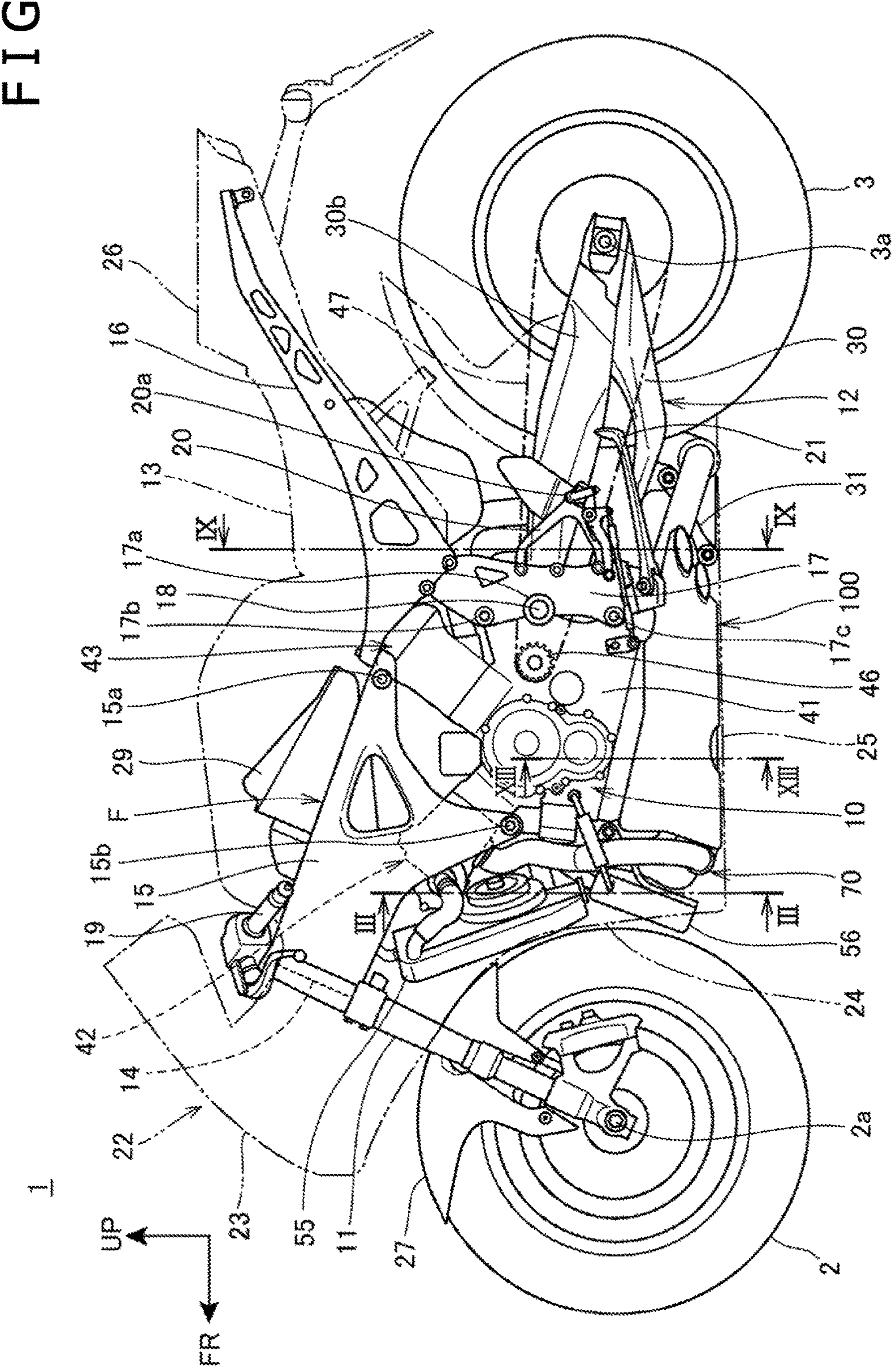
FIG. 1 is a left side view of a motorcycle according to an embodiment of the present invention.

FIG. 1 is a left side view of a motorcycle according to the embodiment of the present invention. It is to be noted that FIG. 1 illustrates only left side parts of pairs of left and right parts.

The motorcycle 1 is a vehicle in which an engine 10 (an internal combustion engine or a V-type internal combustion engine) as a power unit is supported by a vehicle body frame F, a front fork 11 that supports a front wheel 2 is steerably supported by a front end of the vehicle body frame F, and a suspension device 12 that supports a rear wheel 3 is provided to a rear side of the vehicle body frame F. The motorcycle 1 is a saddle riding type vehicle in which a seat 13 that an occupant is seated so as to straddle is disposed on an upper part of a rear portion of the vehicle body frame F. The motorcycle 1 is also a rocking vehicle whose vehicle body rocks (banks) to the left or right when making a turn.

The vehicle body frame F includes: a head pipe 14 that is disposed at a front end of the vehicle body frame F and rotatably supports the front fork 11; a pair of left and right main frames 15, 15 that extend rearward from the head pipe 14 so as to be inclined obliquely downward; a pair of left and right seat frames 16, 16 that extend rearwardly upward from rear end portions of the main frames 15, 15 to a rear end portion of the vehicle; and a pair of left and right pivot frames 17, 17 that extend downward from front portions of the seat frames 16, 16.

The main frames 15, 15 are formed such that a lateral interval therebetween is increased toward the rear side as viewed in plan. The main frames 15, 15 have an upper side engine hanger portion 15*a* on the rear end portions of the main frames 15, 15. The main frames 15, 15 have a front side engine hanger portion 15*b* on lower end portions of downward extending portions of the main frames 15, 15, the downward extending portions extending downward from longitudinally intermediate portions of the main frames 15, 15.

The pivot frames 17, 17 have a pivot supporting hole portion 17*a* in vertically intermediate portions of the pivot frames 17, 17. The pivot supporting hole portions 17*a* support a pivot shaft 18 that couples the left and right pivot frames 17, 17 to each other in a vehicle width direction.

The pivot frames 17, 17 have rear side engine hanger portions 17*b* and 17*c* on upper portions and lower portions of front edge portions of the pivot frames 17, 17.

A driver seated on the seat 13 steers the front wheel 2 via handlebars 19 attached to an upper end of the front fork 11. The front wheel 2 is rotatably supported by a front wheel axle 2*a* provided between lower end portions of a left fork tube and a right fork tube of the front fork 11.

The suspension device 12 includes: a swing arm 30 that swingably supports the rear wheel 3; and a cushion device 31 that cushions swinging of the swing arm 30. The swing arm 30 has a front end portion thereof rotatably supported by the pivot shaft 18. The swing arm 30 therefore vertically swings about the pivot shaft 18. The rear wheel 3 is rotatably supported by a rear wheel axle 3*a* inserted into a rear end portion of the swing arm 30.

The seat 13 is disposed on upper parts of front portions of the seat frames 16, 16.

A pair of left and right step holders 20, 20 that extend rearward is disposed on lower portions of the left and right pivot frames 17, 17. A pair of left and right main steps 20*a* and 20*a* on which the driver puts feet thereof is attached to the step holders 20, 20, and is located in the rear of the pivot frames 17, 17.

A side stand 21 is attached to a lower end portion of the left pivot frame 17.

The motorcycle 1 has a vehicle body cover 22. The vehicle body cover 22 includes: a front cover 23 that covers a peripheral portion of the head pipe 14 from a front side; a front side cover 24 that covers a front portion of the vehicle body frame F from a side; an under cover 25 that covers the engine 10 and the like from below; and a rear cover 26 that covers the rear portion of the vehicle body frame F. The front fork 11 is provided with a front fender 27.

An air cleaner box 29 that purifies air to be supplied to the engine 10 is disposed in upper parts of rear portions of the main frames 15, 15.

Figure 2:
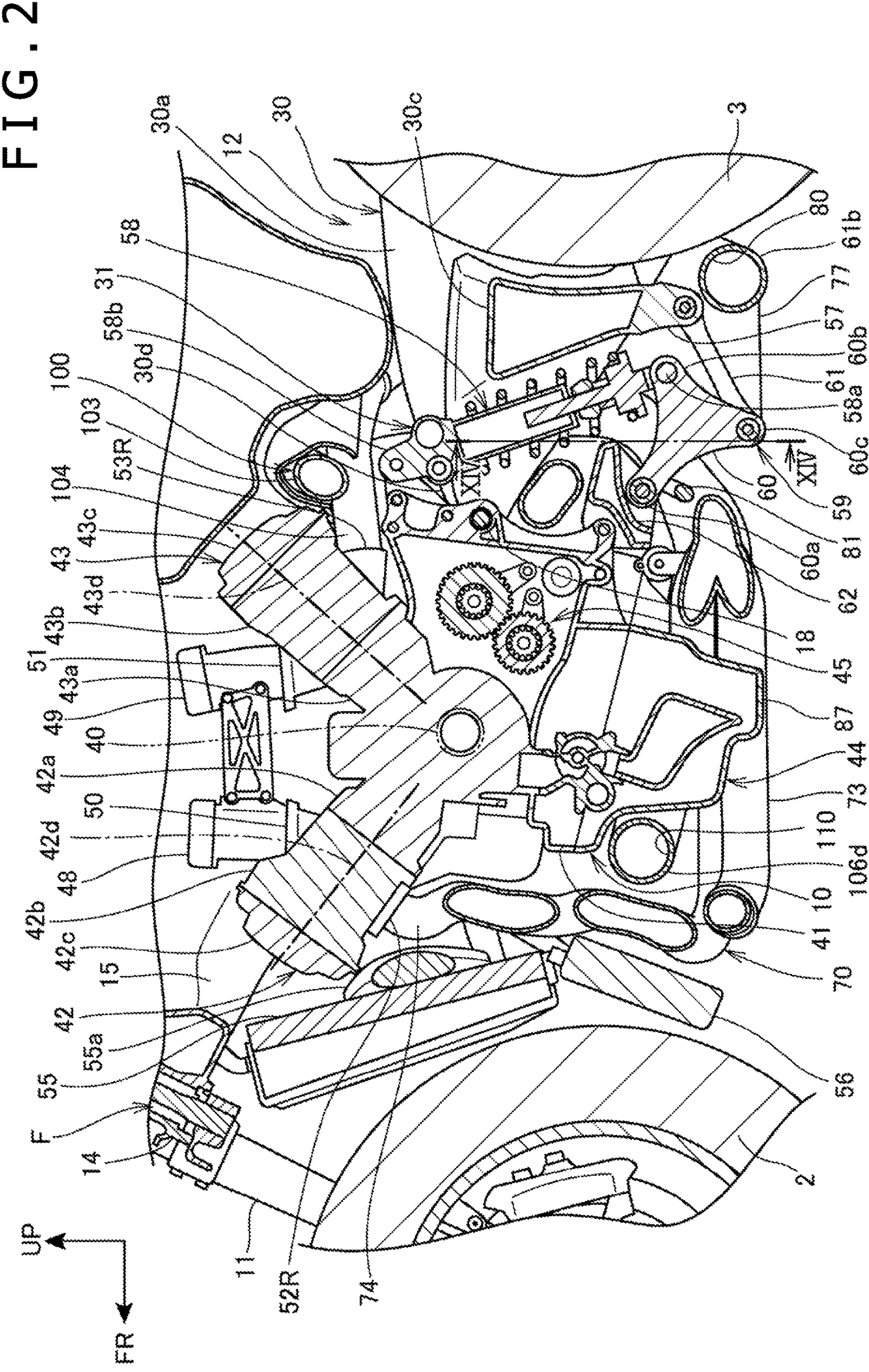
FIG. 2 is a sectional view obtained by sectioning the motorcycle 1 by a vertical plane along a center line in a vehicle width direction.
Figure 3:
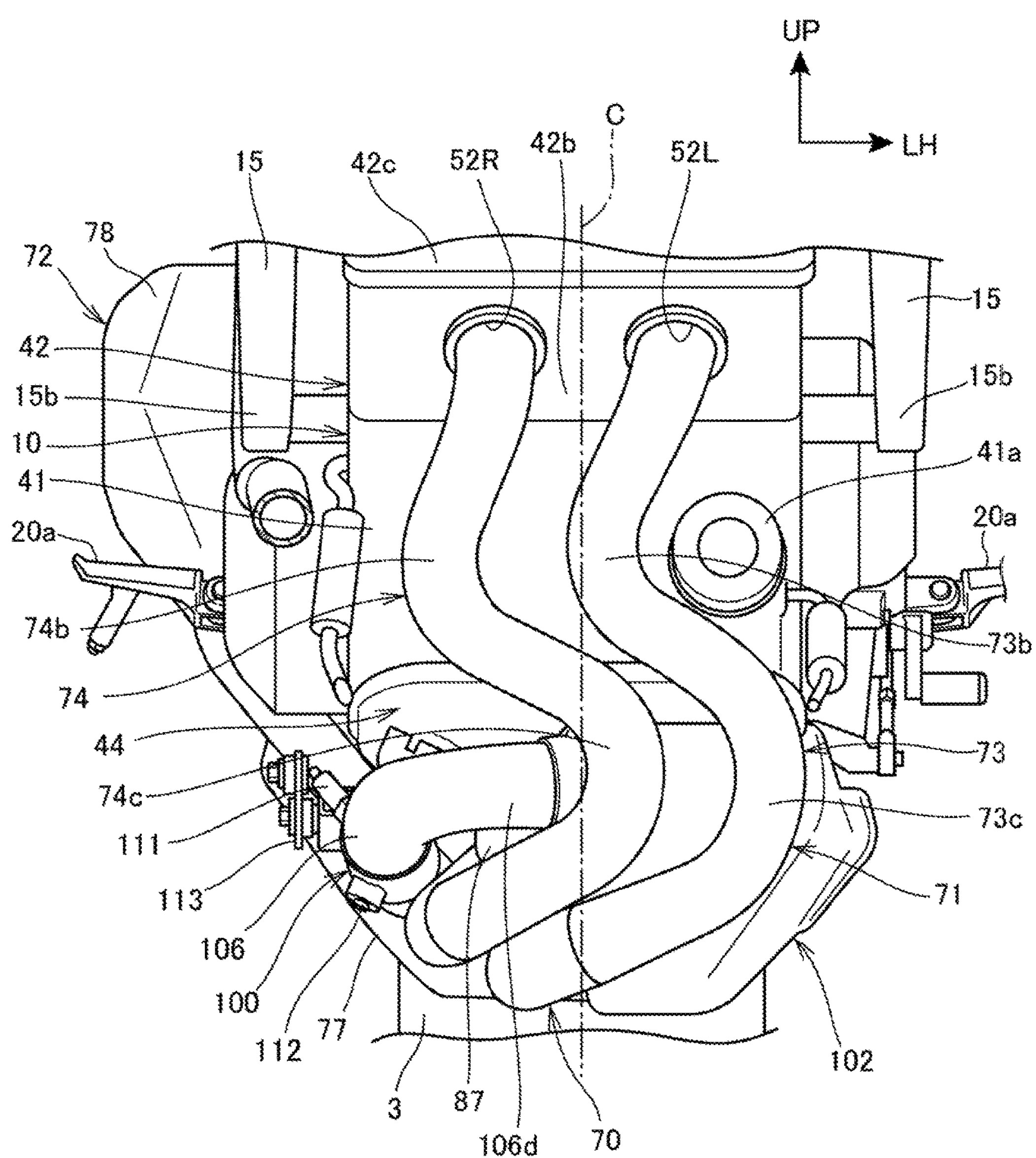
FIG. 3 is a sectional view taken along a line III-III of FIG. 1.

FIG. 2 is a sectional view obtained by sectioning the motorcycle 1 by a vertical plane along a center line in the vehicle width direction. FIG. 3 is a sectional view taken along a line III-III of FIG. 1. A blower fan 55*a*, an oil cooler 56, and the like to be described later are not shown in FIG. 3.

Referring to FIGS. 1 to 3, the engine 10 is a V-type engine in which a front cylinder portion 42 (cylinder portion) and a rear cylinder portion 43 (cylinder portion) forming a pair as the front and rear portions are longitudinally arranged in a V-shape. The engine 10 in the present embodiment is a V-type four-cylinder engine.

The engine 10 includes: a crankcase 41 that houses a crankshaft 40 extending in the vehicle width direction; the front cylinder portion 42 that obliquely extends in a forwardly upward direction from an upper portion of a front portion of the crankcase 41; the rear cylinder portion 43 that is in the rear of the front cylinder portion 42 and obliquely extends in a rearwardly upward direction from an upper portion of the crankcase 41; and an oil pan 44 attached to a lower surface of the crankcase 41.

A transmission 45 including a plurality of gears is housed in a rear portion of the crankcase 41. The output of the engine 10 is transmitted to the rear wheel 3 by a driving chain 47 stretched between a driving sprocket 46 (FIG. 1) provided to an output shaft of the transmission 45 and the rear wheel 3.

The front cylinder portion 42 includes: a front cylinder block 42*a* formed integrally with the front upper portion of the crankcase 41; a front cylinder head 42*b* coupled to an upper end of the front cylinder block 42*a*; and a front head cover 42*c* that covers a top surface of the front cylinder head 42*b*. The front cylinder portion 42 has a forwardly inclined cylinder axis 42*d*. The front cylinder portion 42 projects forwardly of a front surface of the crankcase 41. The front cylinder portion 42 includes a plurality of (two) parallel cylinders arranged in the vehicle width direction.

The rear cylinder portion 43 includes: a rear cylinder block 43*a* formed integrally with the upper portion of the crankcase 41; a rear cylinder head 43*b* coupled to an upper end of the rear cylinder block 43*a*; and a rear head cover 43*c* that covers a top surface of the rear cylinder head 43*b*. The rear cylinder portion 43 has a rearwardly inclined cylinder axis 43*d*. The rear cylinder portion 43 extends above the transmission 45. The rear cylinder portion 43 includes a plurality of (two) parallel cylinders arranged in the vehicle width direction.

The engine 10 is disposed between the left and right main frames 15, 15, between the front portions of the left and right seat frames 16, 16, and between the left and right pivot frames 17, 17. The engine 10 is supported so as to be hung from the vehicle body frame F.

Specifically, as shown in FIG. 1, the front portion of the crankcase 41 of the engine 10 is supported by the front side engine hanger portion 15*b*, a front portion of an upper portion of the rear cylinder head 43*b* is supported by the upper side engine hanger portion 15*a*, and the rear portion of the crankcase 41 is supported by the rear side engine hanger portions 17*b* and 17*c* and the pivot shaft 18.

The front cylinder portion 42 is covered by the left and right main frames 15, 15 from the outside in the vehicle width direction.

As shown in FIG. 2, a rear surface of the front cylinder head 42*b* is provided with a pair of left and right front intake ports 50, 50 arranged in the vehicle width direction so as to correspond to the two cylinders on the front side.

A front surface of the rear cylinder head 43*b* is provided with a pair of left and right rear intake ports 51, 51 arranged in the vehicle width direction so as to correspond to the two cylinders on the rear side.

A front throttle body 48 and a rear throttle body 49 connected to the front intake ports 50, 50 and the rear intake ports 51, 51, respectively, are arranged using a space between the front cylinder portion 42 and the rear cylinder portion 43.

A forwardly rising front surface of the front cylinder head 42*b* is provided with a pair of left and right front exhaust ports 52L and 52R (exhaust ports) arranged in the vehicle width direction so as to correspond to the two cylinders on the front side. The front exhaust ports 52L and 52R are arranged separately on the left and right of a vehicle center C in the vehicle width direction. The vehicle center C in this case includes a straight line passing through centers of the front wheel 2 and the rear wheel 3 in the vehicle width direction.

A cylindrical oil filter cartridge 41*a* that filters engine oil is attached to the front surface of the crankcase 41 below the front exhaust port 52L on the left side.

A rearwardly rising rear surface of the rear cylinder head 43*b* is provided with a pair of left and right rear exhaust ports 53L and 53R (exhaust ports) (see FIG. 9) arranged in the vehicle width direction so as to correspond to the two cylinders on the rear side. The rear exhaust ports 53L and 53R are arranged separately on the left and right of the vehicle center C in the vehicle width direction. In the vehicle width direction, the front exhaust port 52L on the left side (other side) and the rear exhaust port 53L are disposed at positions substantially coinciding with each other. In addition, in the vehicle width direction, the front exhaust port 52R on the right side (one side) and the rear exhaust port 53R are disposed at positions substantially coinciding with each other.

The front exhaust ports 52L and 52R are connected with a front side exhaust device 70 (exhaust device) through which exhaust from the front cylinder head 42*b* passes.

The rear exhaust ports 53L and 53R are connected with a rear side exhaust device 100 (exhaust device) through which exhaust from the rear cylinder head 43*b* passes.

A plate-shaped radiator 55 that radiates the heat of cooling water in the engine 10 is disposed between the front cylinder portion 42 and the front wheel 2. The radiator 55 has a blower fan 55*a* on a rear surface side of the radiator 55. An oil cooler 56 that radiates the heat of the oil in the engine 10 is disposed below the radiator 55 and in front of the front side exhaust device 70.

Referring to FIG. 1 and FIG. 2, the swing arm 30 includes: a one-side (right side) arm 30*a* and an other-side (left side) arm 30*b* disposed on the right side and the left side, respectively, of the rear wheel 3; and a cross member 30*c* that couples the one-side arm 30*a* and the other-side arm 30*b* to each other in the vehicle width direction in front of the rear wheel 3.

Front end portions 30*d* of the one-side arm 30*a* and the other-side arm 30*b* of the swing arm 30 are disposed inward of the left and right pivot frames 17, 17. The swing arm 30 is rotatably supported by the pivot shaft 18 inserted through the front end portions 30*d*.

The cross member 30*c* has a link coupling portion 57 that projects downward of undersurfaces of the one-side arm 30*a* and the other-side arm 30*b*.

The cushion device 31 includes: a tubular suspension 58 that makes a stroke in an axial direction thereof; and a link mechanism 59 that couples a lower end portion 58*a* of the suspension 58 to the swing arm 30. The suspension 58 internally includes an oil or a gas that attenuates the stroke of the suspension 58.

An upper end portion 58*b* of the suspension 58 is located in the rear of the crankcase 41 and below the rear exhaust ports 53L and 53R, and is coupled to the vehicle body frame F. The suspension 58 is passed through a space between the cross member 30*c* and the pivot shaft 18 in an upward-downward direction.

The link mechanism 59 includes: a link plate 60 that has a substantially triangular shape as viewed from the side; and a pair of left and right link arms 61, 61 that extend rearward from the link plate 60 and are coupled to the swing arm 30.

The vehicle body frame F includes a lower cross frame 62 that connects lower end portions of the left and right pivot frames 17, 17 to each other in the vehicle width direction.

The link plate 60 is disposed in an orientation such that one vertex portion of the triangular shape projects downward as viewed from the side.

Specifically, the link plate 60 includes a frame coupling portion 60*a* coupled to the lower cross frame 62 in a front end portion of the link plate 60, includes a suspension coupling portion 60*b* coupled to the lower end portion 58*a* of the suspension 58 in a rear end portion of the link plate 60, and includes a link arm connecting portion 60*c* coupled to front end portions of the link arms 61, 61 in a lower end portion of the link plate 60.

The link arms 61, 61 are formed in the shape of a bar longitudinally extending in a linear manner, and are arranged on the respective left and right sides of the link plate 60.

The link arms 61, 61 include a plate connecting portion 61*a* coupled to the link arm connecting portion 60*c* of the link plate 60 in front end portions of the link arms 61, 61, and include a swing arm coupling portion 61*b* coupled to the link coupling portion 57 of the swing arm 30 in rear end portions of the link arms 61, 61.

The link coupling portion 57 is located in the rear of the suspension coupling portion 60*b* and the link arm connecting portion 60*c* as viewed from the side, and is located above the link arm connecting portion 60*c*. Therefore, the linearly extending link arms 61, 61 incline rearwardly upward and extend rearward as viewed from the side.

The oil pan 44 is formed so as to bulge downward in order to be able to retain oil.

Figure 4:
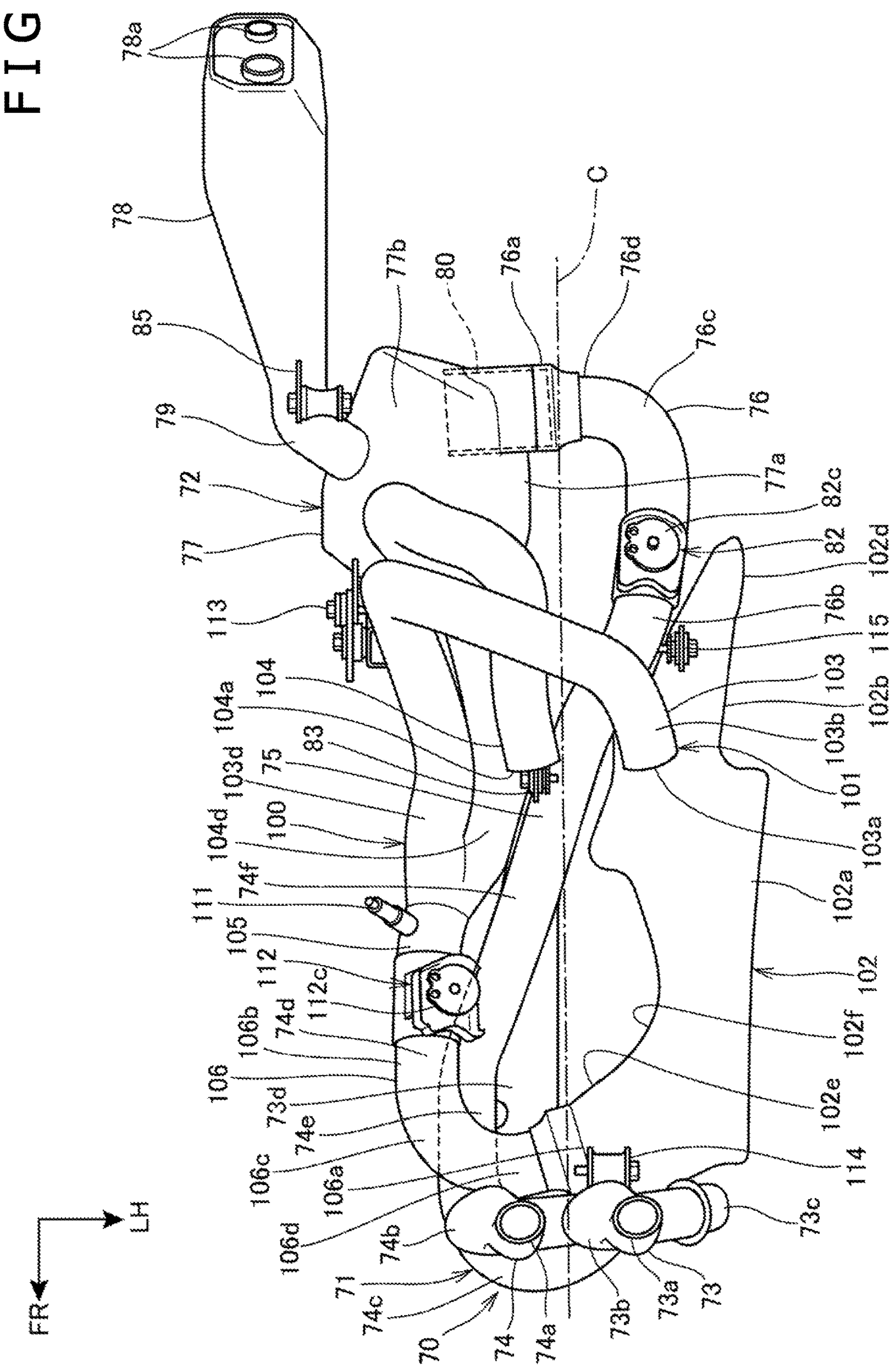
FIG. 4 is a plan view of a front side exhaust device and a rear side exhaust device as viewed from above.
Figure 5:
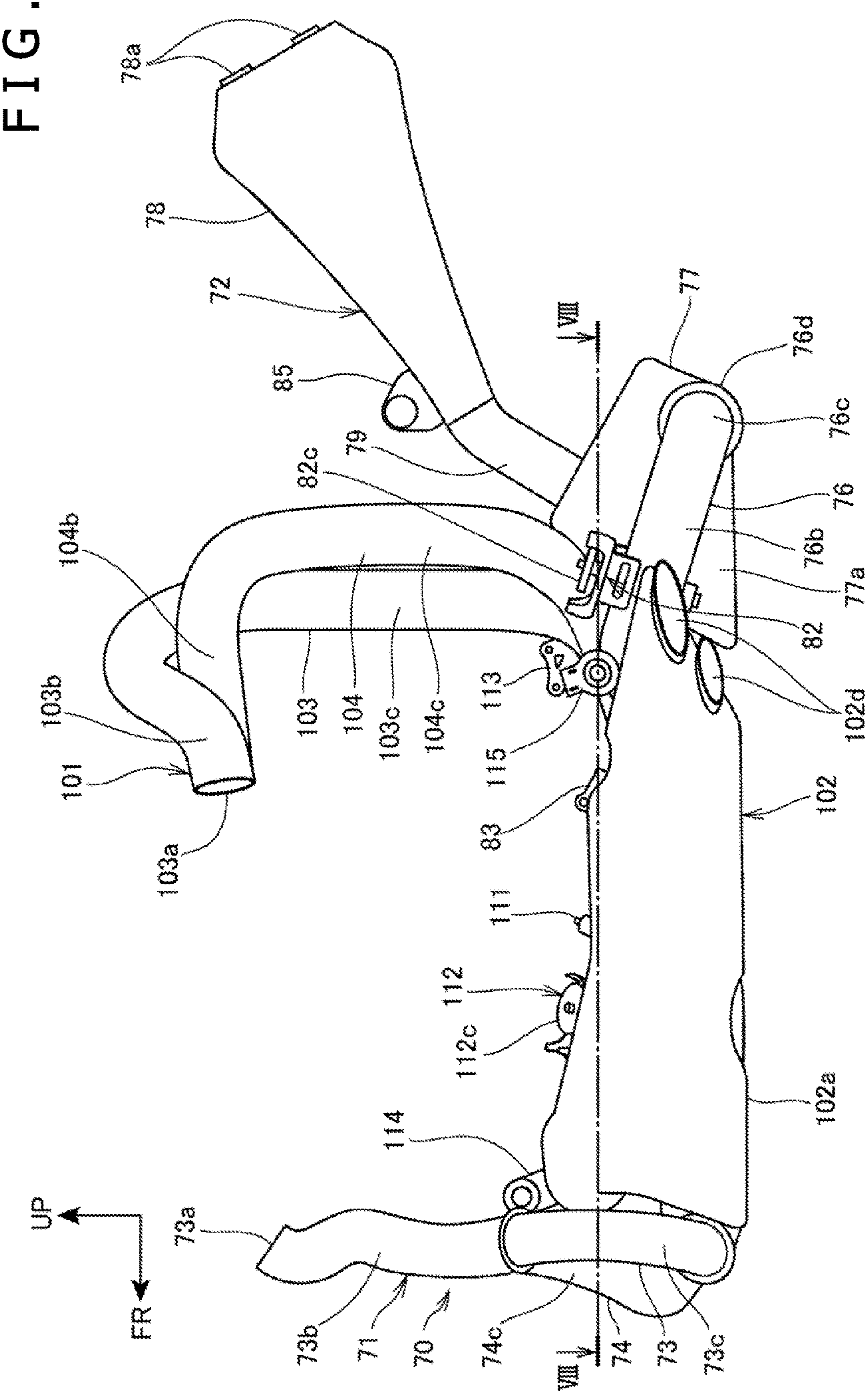
FIG. 5 is a left side view of the front side exhaust device and the rear side exhaust device.
Figure 6:
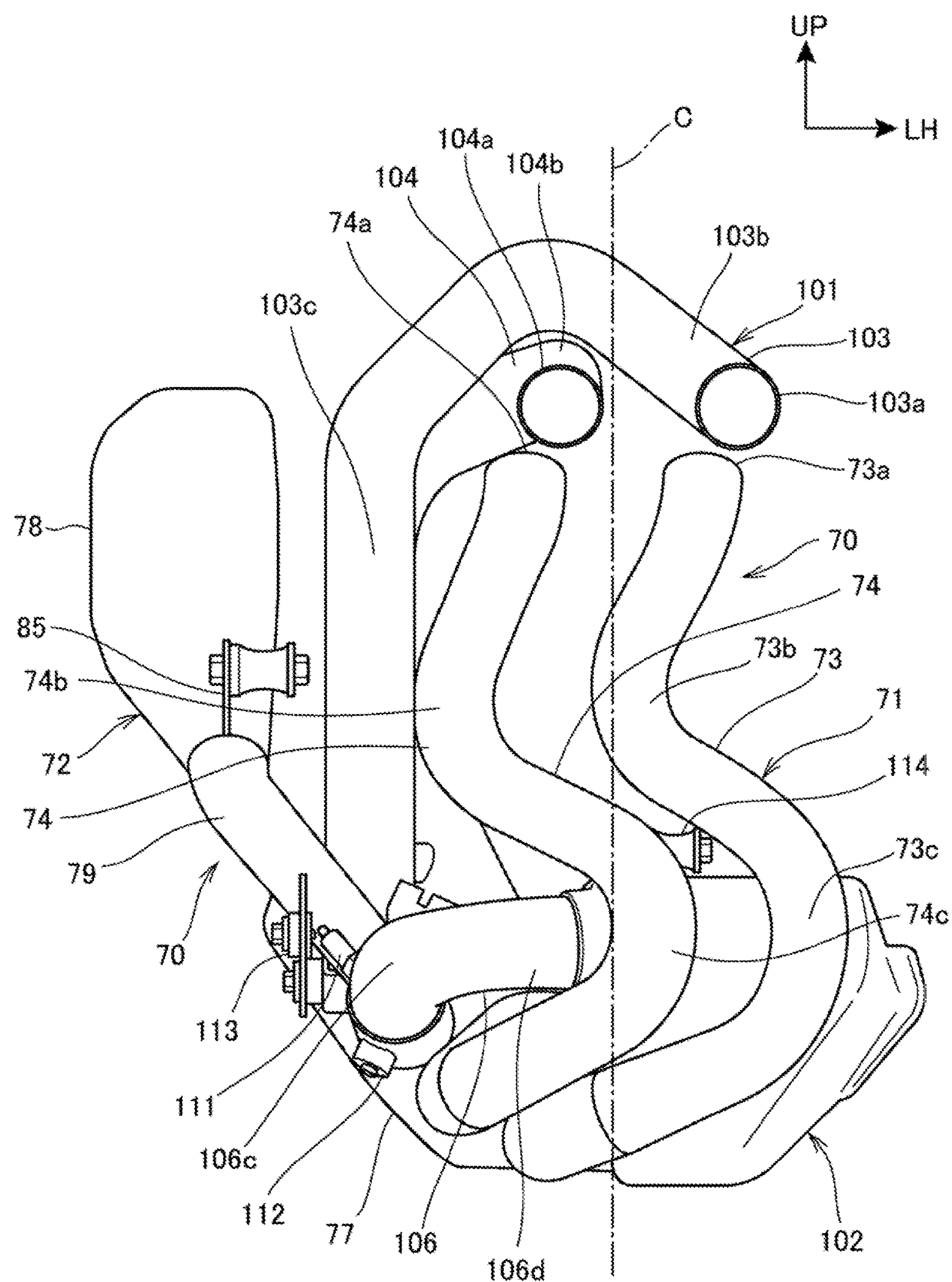
FIG. 6 is a front view of the front side exhaust device and the rear side exhaust device as viewed from a front side.
Figure 7:
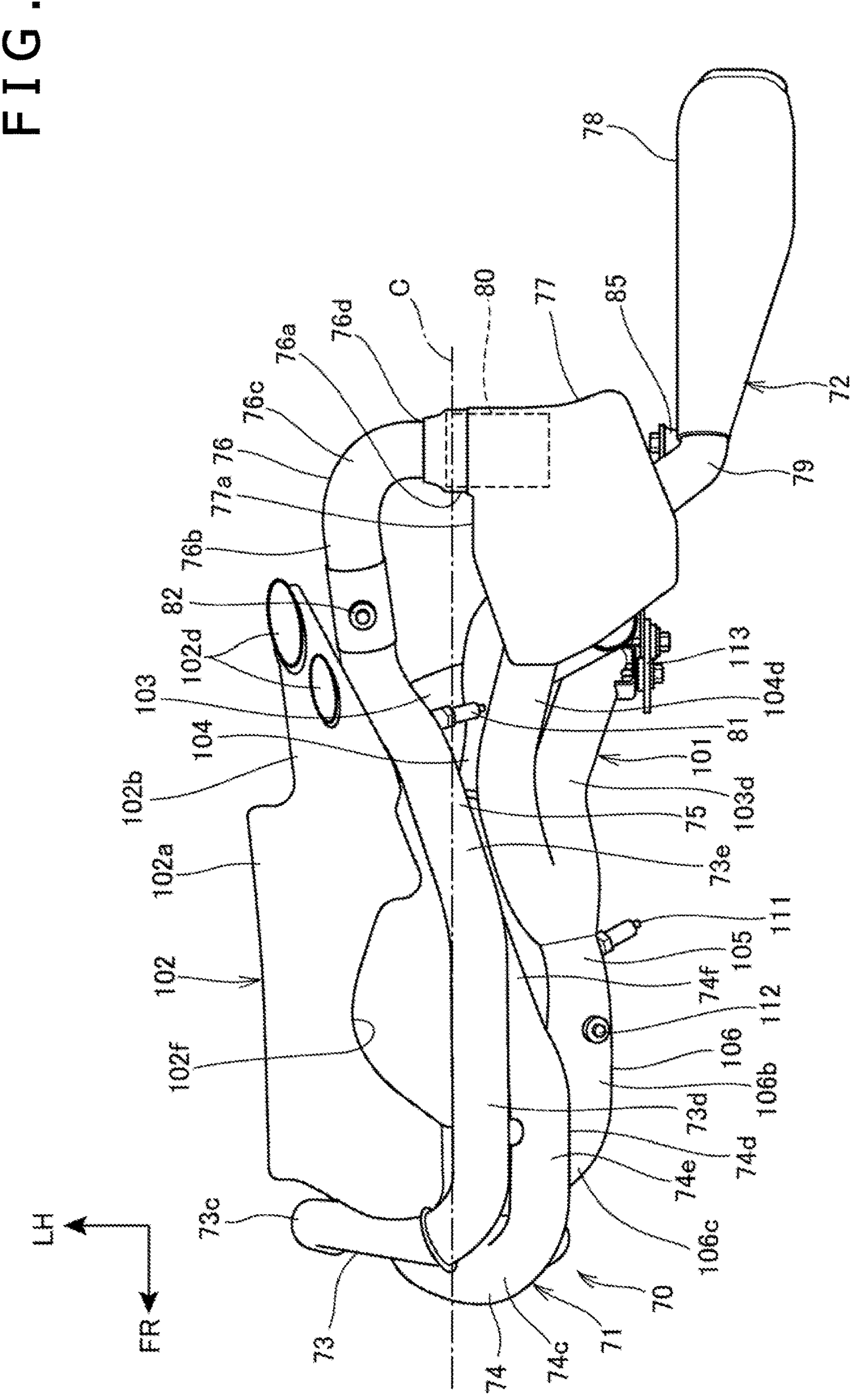
FIG. 7 is a plan view of the front side exhaust device and the rear side exhaust device as viewed from below.
Figure 8:
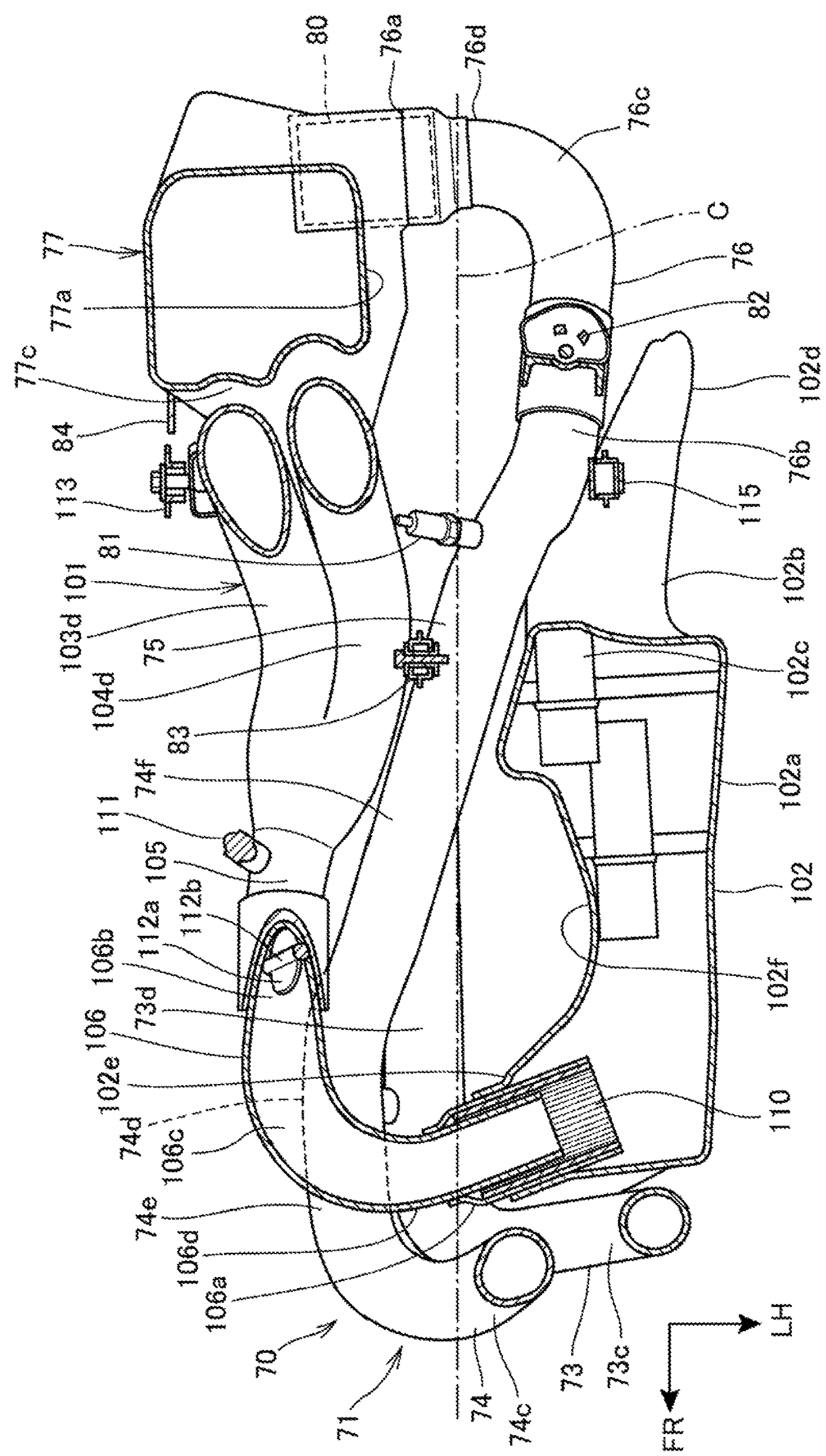
FIG. 8 is a sectional view taken along a line VIII-VIII of FIG. 5.

FIG. 4 is a plan view of the front side exhaust device 70 and the rear side exhaust device 100 as viewed from above. FIG. 5 is a left side view of the front side exhaust device 70 and the rear side exhaust device 100. FIG. 6 is a front view of the front side exhaust device 70 and the rear side exhaust device 100 as viewed from the front side. FIG. 7 is a plan view of the front side exhaust device 70 and the rear side exhaust device 100 as viewed from below. FIG. 8 is a sectional view taken along a line VIII-VIII of FIG. 5. Incidentally, in the following description, the right side in the vehicle width direction may be referred to as one side, and the left side in the vehicle width direction may be referred to as the other side.

Referring to FIGS. 4 to 8, the front side exhaust device 70 includes: a front side exhaust pipe 71 (exhaust pipe) having an upstream end thereof connected to the front exhaust ports 52L and 52R (FIG. 3); and a first muffler 72 (a muffler, an expansion chamber, or a rear side muffler) connected to a downstream end of the front side exhaust pipe 71. The front side exhaust device 70 is an exhaust device independently connected to the front cylinder portion 42. Exhaust from the rear cylinder portion 43 therefore does not flow through the front side exhaust device 70.

The front side exhaust pipe 71 includes: a front side first exhaust pipe 73 having an upstream end 73*a* connected to the front exhaust port 52L on the left side; a front side second exhaust pipe 74 having an upstream end 74*a* connected to the front exhaust port 52R on the right side; a front side collecting portion 75 (collecting portion) in which the front side first exhaust pipe 73 and the front side second exhaust pipe 74 merge into one; and a front side collecting pipe 76 that extends as one pipe from the front side collecting portion 75 and whose downstream end 76*a* is connected to the first muffler 72.

The first muffler 72 includes: a front muffling portion 77 connected to the downstream end 76*a* of the front side collecting pipe 76; a rear muffling portion 78 disposed downstream of the front muffling portion 77; and a connecting pipe 79 connecting the front muffling portion 77 and the rear muffling portion 78 to each other.

Referring to FIG. 3 and FIG. 6, the front side first exhaust pipe 73 includes: an upper bent portion 73*b* that extends downward from the front exhaust port 52L on the left side, bends to the inside (one side) in the vehicle width direction in front of the crankcase 41 so as to avoid the oil filter cartridge 41*a* (FIG. 3), and thereafter bends to the outside (other side) in the vehicle width direction, that is, to a position below the oil filter cartridge 41*a*; and a lower bent portion 73*c* that is in front of the oil pan 44 and extends downward and inward in the vehicle width direction. The upper bent portion 73*b* once overlaps the vehicle center C, and then returns to the left side.

A lower end portion of the lower bent portion 73*c* is located on the right side (one side) of the vehicle body across the vehicle center C, that is, on an opposite side of the vehicle center C from the side of the front exhaust port 52L.

In addition, referring to FIG. 4, FIG. 6, and FIG. 7, the front side first exhaust pipe 73 includes a rearward extending portion 73*d* that bends rearward from the lower end of the lower bent portion 73*c* and which extends rearward in a substantially straight manner on the right side of the vehicle body. The rearward extending portion 73*d* includes a rear end portion 73*e* (FIG. 7) that bends inward in the vehicle width direction so as to overlap the vehicle center C.

Referring to FIG. 3 and FIG. 6, the front side second exhaust pipe 74 includes: an upper bent portion 74*b* that extends downward from the front exhaust port 52R on the right side and bends so as to be along the upper bent portion 73*b* of the front side first exhaust pipe 73; and a lower bent portion 74*c* that bends so as to be along the lower bent portion 73*c* in front of the oil pan 44. The lower bent portion 74*c* once crosses the vehicle center C to the left side (other side), and then returns to the right side.

A lower end portion of the lower bent portion 74*c* extends outward in the vehicle width direction so as to be along an upper surface of the lower bent portion 73*c* of the front side first exhaust pipe 73, and is located on the outside (one side) in the vehicle width direction of and in front of the lower end portion of the lower bent portion 73*c*.

In addition, referring to FIG. 4, FIG. 6, and FIG. 7, the front side second exhaust pipe 74 includes a rearward extending portion 74*d* that bends rearward from the lower end of the lower bent portion 74*c* and which extends rearward on the right side of the vehicle body. The rearward extending portion 74*d* includes: an extending portion front portion 74*e* that extends rearward so as to pass on the outside of and above the rearward extending portion 73*d*; and an extending portion rear portion 74*f* that bends to the vehicle center C side and extends rearward obliquely.

A rear end portion of the extending portion rear portion 74*f* extends rearward so as to pass above the rear end portion 73*e* of the front side first exhaust pipe 73, and is connected, at a position overlapping the vehicle center C, to the front side collecting portion 75.

The rear end portion 73*e* of the rearward extending portion 73*d* of the front side first exhaust pipe 73 is connected, at a position under the extending portion rear portion 74*f*, to the front side collecting portion 75.

That is, parts of the front side first exhaust pipe 73 and the front side second exhaust pipe 74 which parts are immediately in front of the front side collecting portion 75 are arranged next to each other vertically so as to be compact in the vehicle width direction.

The front side collecting pipe 76 of the front side exhaust pipe 71 includes: a rearward extending portion 76*b* that extends obliquely from the front side collecting portion 75 to a left rear (rear on the other side); a rear bent portion 76*c* that bends inward in the vehicle width direction from a rear end of the rearward extending portion 76*b* located on the other side of the vehicle body; and a linear portion 76*d* that linearly extends in the vehicle width direction from an end of the rear bent portion 76*c*.

The linear portion 76*d* straddles the vehicle center C so as to be substantially orthogonal to the vehicle center C, and is connected to the first muffler 72 located on the right side (one side) of the vehicle body.

The front muffling portion 77 of the first muffler 72 is an expansion chamber formed in a box shape. The front muffling portion 77 is formed so as to be larger than the linear portion 76*d* as viewed from the side.

A downstream end of the linear portion 76*d* of the front side collecting pipe 76 is connected by insertion to a rear portion of a side wall portion 77*a* on the inside in the vehicle width direction of the front muffling portion 77. A part of the linear portion 76*d* which part is connected to the side wall portion 77*a* is formed so as to have a large diameter. A tubular catalytic device 80 is disposed within this large-diameter part. An end portion of the linear portion 76*d* extends to the inside of the front muffling portion 77. A part of the catalytic device 80 is therefore disposed within the front muffling portion 77.

The connecting pipe 79 extends outward in the vehicle width direction and rearwardly upward from a top wall portion 77*b* (top surface) of the front muffling portion 77, and is connected to a front end portion of the rear muffling portion 78.

The rear muffling portion 78 is a longitudinally long tubular expansion chamber formed so as to have a larger diameter than the diameter of the connecting pipe 79. Exhaust ports 78*a* of the rear muffling portion 78 are oriented rearwardly upward.

The front side exhaust device 70 includes an exhaust gas sensor 81 and an exhaust valve 82 that controls the opening and closing of an exhaust pipe passage of the front side exhaust device 70.

The exhaust gas sensor 81 is provided to a front end portion of the rearward extending portion 76*b* of the front side collecting pipe 76. The exhaust gas sensor 81 is formed in the shape of a rod, and is provided so as to be inserted into an upper portion of the rearward extending portion 76*b*. A detecting portion of the exhaust gas sensor 81 is located within the rearward extending portion 76*b*, and detects the oxygen concentration of an exhaust gas exhausted from the front cylinder portion 42.

The exhaust valve 82 is disposed in the rearward extending portion 76*b* and between the exhaust gas sensor 81 and the rear bent portion 76*c*.

The front side exhaust device 70 also includes stays 83, 84, 85 that fix the front side exhaust device 70 to the vehicle body side. The stay 83 extends upward from the front side collecting portion 75. The stay 84 extends forward from a front wall portion 77*c* of the front muffling portion 77. The stay 85 extends upward from the front end portion of the rear muffling portion 78.

Referring to FIGS. 4 to 8, the rear side exhaust device 100 includes: a rear side exhaust pipe 101 (exhaust pipe) having an upstream end thereof connected to the rear exhaust ports 53L and 53R (FIG. 9); and a second muffler 102 (a muffler, an expansion chamber, or a front side muffler) connected to a downstream end of the rear side exhaust pipe 101. The rear side exhaust device 100 is an exhaust device independently connected to the rear cylinder portion 43. Exhaust from the front cylinder portion 42 therefore does not flow through the rear side exhaust device 100.

The rear side exhaust pipe 101 includes: a rear side first exhaust pipe 103 having an upstream end 103*a* connected to the rear exhaust port 53L on the left side; a rear side second exhaust pipe 104 having an upstream end 104*a* connected to the rear exhaust port 53R on the right side; a rear side collecting portion 105 (collecting portion) in which the rear side first exhaust pipe 103 and the rear side second exhaust pipe 104 merge into one; and a rear side collecting pipe 106 that extends as one pipe from the rear side collecting portion 105 and whose downstream end 106*a* is connected to the second muffler 102.

Referring to FIGS. 4 to 8, the rear side first exhaust pipe 103 includes: a rearward extending portion 103*b* that crosses the vehicle center C from the rear exhaust port 53L (not shown) on the left side and extends obliquely to a right rear (rear on the one side) as viewed in plan; a downward extending portion 103*c* that bends downward from a rear end of the rearward extending portion 103*b* and extends downward toward the front muffling portion 77 of the first muffler 72; and a forward extending portion 103*d* that bends to the front side from a lower end of the downward extending portion 103*c* and extends forward so as to pass on the right side (one side) of the vehicle body.

The rear side second exhaust pipe 104 includes: a rearward extending portion 104*b* that extends obliquely to the right rear from the rear exhaust port 53R on the right side as viewed in plan; a downward extending portion 104*c* that bends downward from a rear end of the rearward extending portion 104*b* and extends downward toward the front muffling portion 77 of the first muffler 72; and a forward extending portion 104*d* that bends to the front side from a lower end of the downward extending portion 104*c* and extends forward so as to pass on the right side (one side) of the vehicle body.

The rearward extending portion 104*b* extends rearward so as to pass below the rearward extending portion 103*b* of the rear side first exhaust pipe 103 and on the inside in the vehicle width direction of the downward extending portion 103*c*.

The downward extending portion 104*c* extends in the rear of and on the inside in the vehicle width direction of the downward extending portion 103*c* of the rear side first exhaust pipe 103 along the downward extending portion 103*c*. Lower end portions of the downward extending portion 103*c* and the downward extending portion 104*c* bend to the front side at positions along the front wall portion 77*c* of the front muffling portion 77.

The forward extending portion 104*d* extends below and on the inside in the vehicle width direction of the forward extending portion 103*d* of the rear side first exhaust pipe 103 along the forward extending portion 103*d*.

In addition, the forward extending portion 103*d* and the forward extending portion 104*d* extend forward so as to pass on the outside (right side) of the front side collecting pipe 76 and the front side collecting portion 75 of the front side exhaust pipe 71.

The forward extending portion 103*d* and the forward extending portion 104*d* merge at the rear side collecting portion 105. The rear side collecting portion 105 is located in front of and on the outside (right side) of the front side collecting portion 75 of the front side exhaust pipe 71.

The rear side collecting pipe 106 includes: a forward extending portion 106*b* that extends forward from the rear side collecting portion 105; a front side bent portion 106*c* that bends inward in the vehicle width direction from a front end of the forward extending portion 106*b*; and a laterally extending portion 106*d* that crosses the vehicle center C from the front side bent portion 106*c* and extends in the vehicle width direction to the left side (other side) of the vehicle body.

The laterally extending portion 106*d* extends in the vehicle width direction so as to pass above the extending portion front portion 74*e* and the rearward extending portion 73*d* of the front side exhaust pipe 71. The downstream end 106*a* of the laterally extending portion 106*d* is connected to the second muffler 102.

The second muffler 102 is an expansion chamber formed in the shape of a box that is longer in a forward-rearward direction than in the vehicle width direction. The second muffler 102 includes: an expansion chamber main body portion 102*a* including a plurality of expansion chambers divided by partition walls; and a tail pipe portion 102*b* that extends rearward from a rear end of the expansion chamber main body portion 102*a*. The tail pipe portion 102*b* is a part through which a tail pipe 102*c* (FIG. 8) passes, the tail pipe 102*c* exhausting exhaust from the expansion chamber main body portion 102*a* into an outside air. Exhaust ports 102*d* of the tail pipe portion 102*b* are oriented rearward.

The second muffler 102 is disposed on the left side (other side) of the vehicle body with respect to the vehicle center C, and extends rearward so as to pass on the other side of the rearward extending portion 74*d* and the rearward extending portion 73*d* of the front side exhaust pipe 71.

The laterally extending portion 106*d* of the rear side exhaust pipe 101 is connected by insertion to a front end portion of a side wall portion 102*e* on the inside in the vehicle width direction of the second muffler 102. A part of the laterally extending portion 106*d* which part is connected to the side wall portion 102*e* is formed so as to have a large diameter. A tubular catalytic device 110 (FIG. 8) is provided within this large-diameter part. An end portion of the laterally extending portion 106*d* extends to the inside of the second muffler 102. A part of the catalytic device 110 is therefore disposed within the second muffler 102.

The rear side exhaust device 100 includes an exhaust gas sensor 111 and an exhaust valve 112 that controls the opening and closing of an exhaust pipe passage of the rear side exhaust device 100.

The exhaust gas sensor 111 is provided to the rear side collecting portion 105. The exhaust gas sensor 111 is formed in the shape of a rod, and is provided so as to be inserted into an upper portion of the rear side collecting portion 105. A detecting portion of the exhaust gas sensor 111 is located within the rear side collecting portion 105, and detects the oxygen concentration of an exhaust gas exhausted from the rear cylinder portion 43.

The exhaust valve 112 is disposed in the rear side collecting pipe 106 and between the exhaust gas sensor 111 and the front side bent portion 106*c*.

The rear side exhaust device 100 also includes stays 113, 114, and 115 that fix the rear side exhaust device 100 to the vehicle body side. The stay 113 is disposed on a lower end portion of the downward extending portion 103*c* of the rear side first exhaust pipe 103. The stay 114 is disposed on a front end portion of the second muffler 102. The stay 115 is disposed on a rear end portion of the second muffler 102.

The positional relation of the front side exhaust device 70 and the rear side exhaust device 100 to the vehicle body and the like will next be described in detail.

As shown in FIG. 3, the front side first exhaust pipe 73 and the front side second exhaust pipe 74 of the front side exhaust device 70 extend downward so as to pass in front of the crankcase 41 and the oil pan 44.

The front side first exhaust pipe 73 and the front side second exhaust pipe 74 are bent rearward from the right side of the vehicle body, and are passed below the engine 10.

Figure 9:
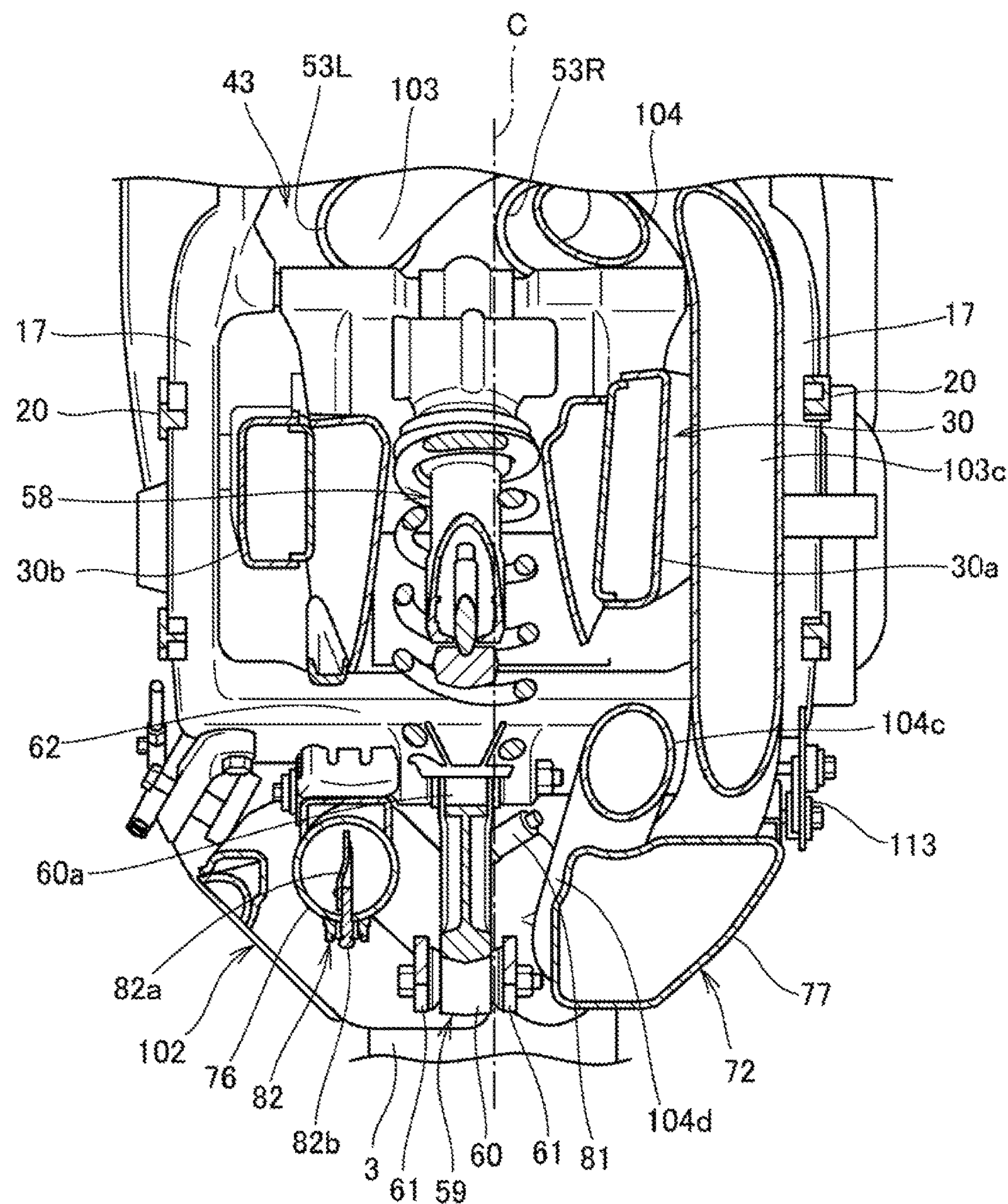
FIG. 9 is a sectional view taken along a line IX-IX of FIG. 1.

FIG. 9 is a sectional view taken along a line IX-IX of FIG. 1.

Referring to FIG. 2, FIG. 5, and FIG. 9, the rearward extending portions 103*b* and 104*b* of the rear side first exhaust pipe 103 and the rear side second exhaust pipe 104 of the rear side exhaust device 100 are drawn out rearward from the rear cylinder portion 43, and pass above the swing arm 30.

The downward extending portions 103*c* and 104*c* of the rear side first exhaust pipe 103 and the rear side second exhaust pipe 104 extend downward in the rear of the pivot frame 17 on the right side (one side) and between the one-side arm 30*a* and the step holder 20 on the right side. That is, the downward extending portions 103*c* and 104*c* are passed on the outside in the vehicle width direction of the one-side arm 30*a*.

The downward extending portions 103*c* and 104*c* of the rear side first exhaust pipe 103 and the rear side second exhaust pipe 104 bend forward on the front side of the first muffler 72. The forward extending portions 103*d* and 104*d* of the rear side first exhaust pipe 103 and the rear side second exhaust pipe 104 extend forward from the right side of the vehicle body, and are passed below the engine 10.

The suspension 58 and the link mechanism 59 are provided in a position overlapping the vehicle center C in the vehicle width direction, but are arranged so as to be offset to the left side (other side) with respect to the vehicle center C.

Figure 10:
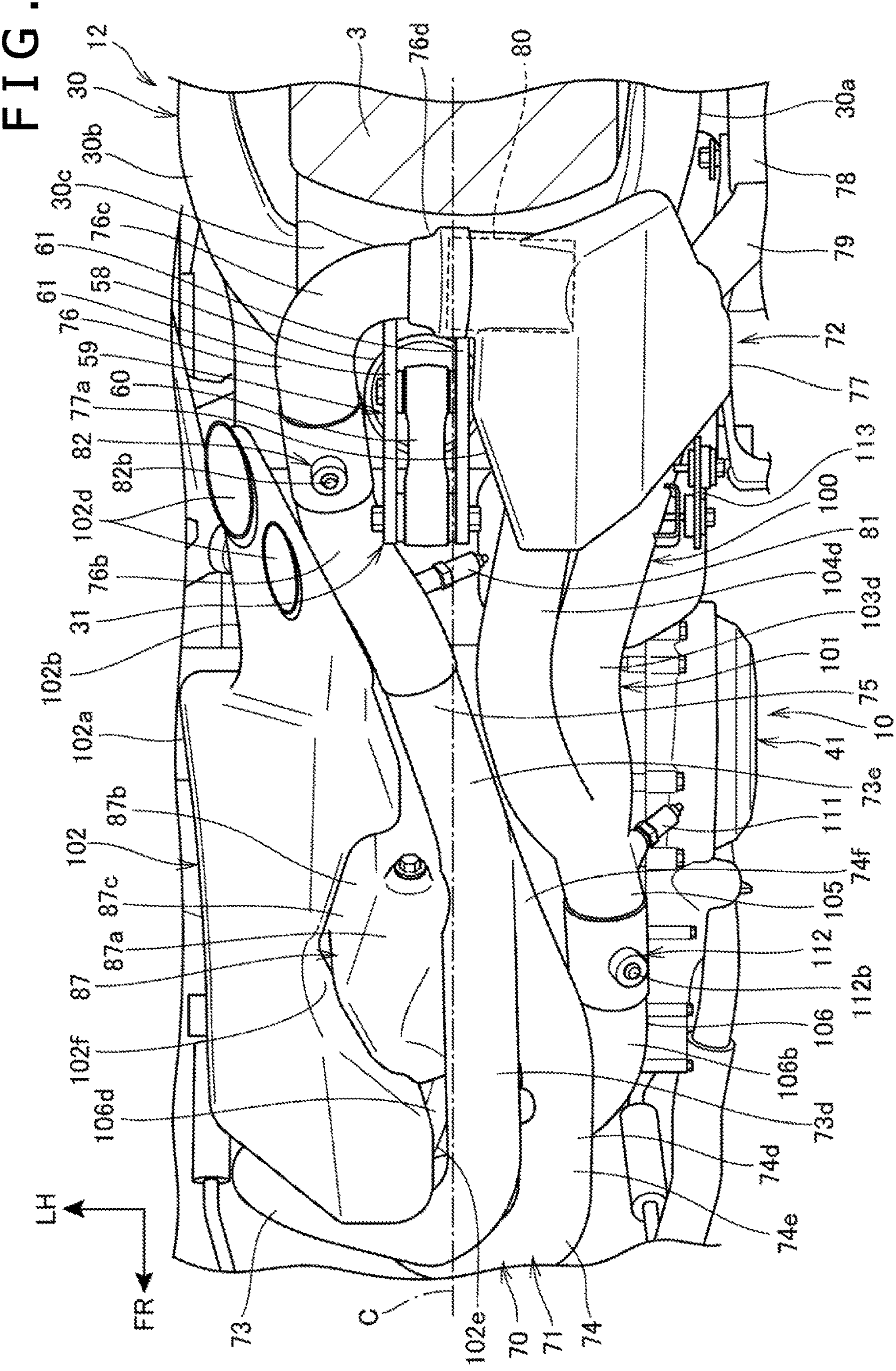
FIG. 10 is a plan view of portions surrounding an engine as viewed from below.
Figure 11:
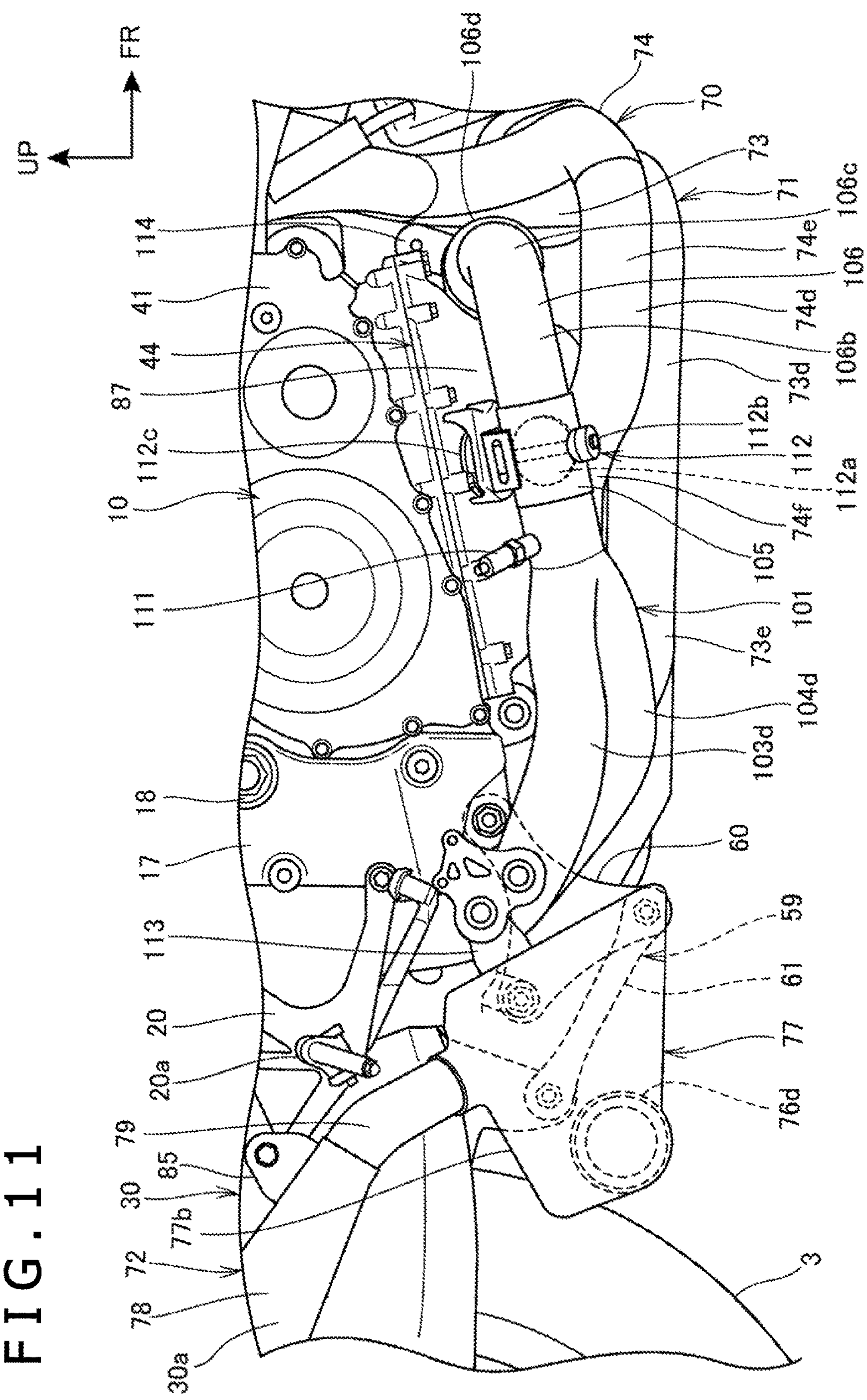
FIG. 11 is a right side view of portions surrounding a lower portion of the engine.
Figure 12:
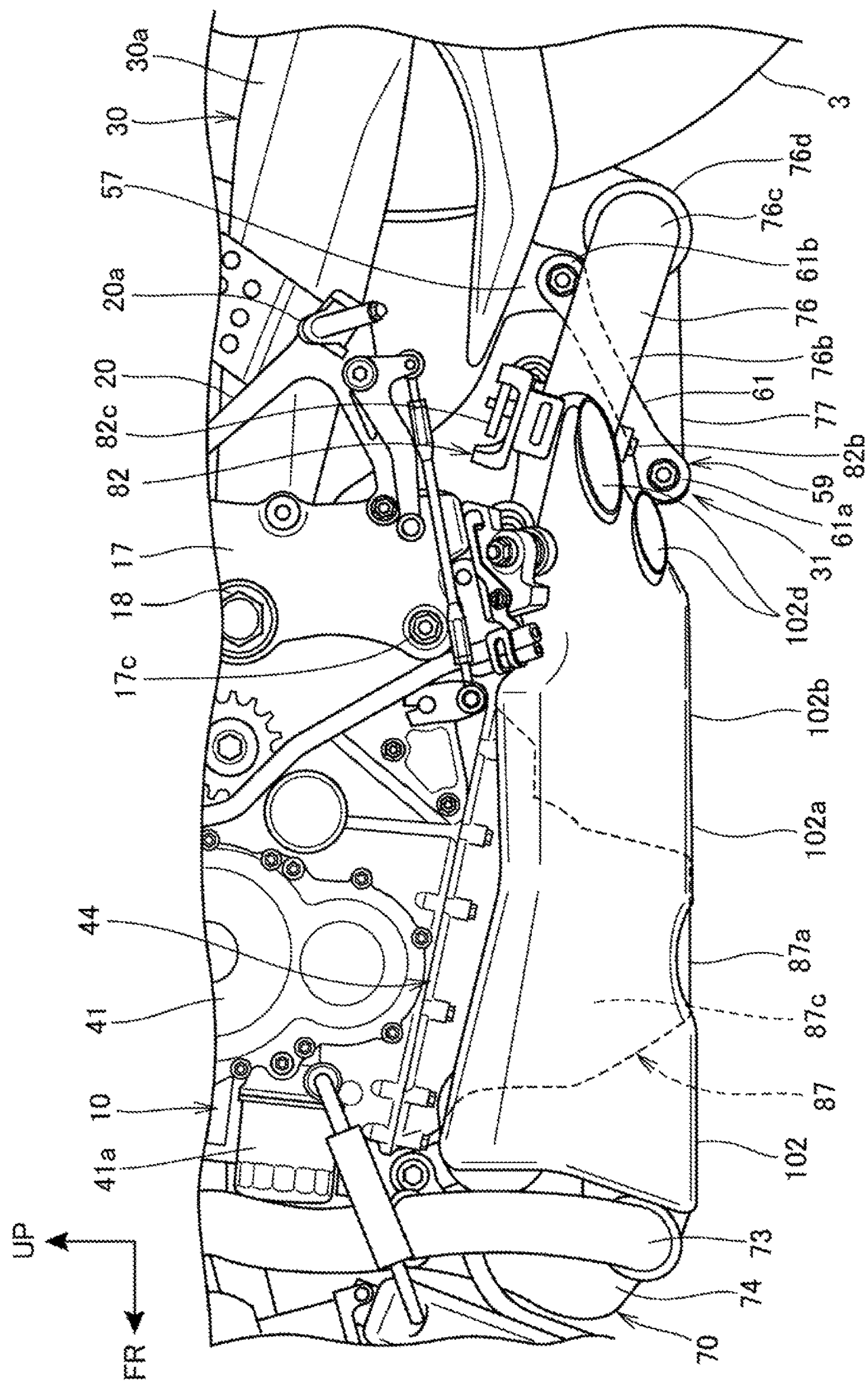
FIG. 12 is a left side view of the portions surrounding the lower portion of the engine.
Figure 13:
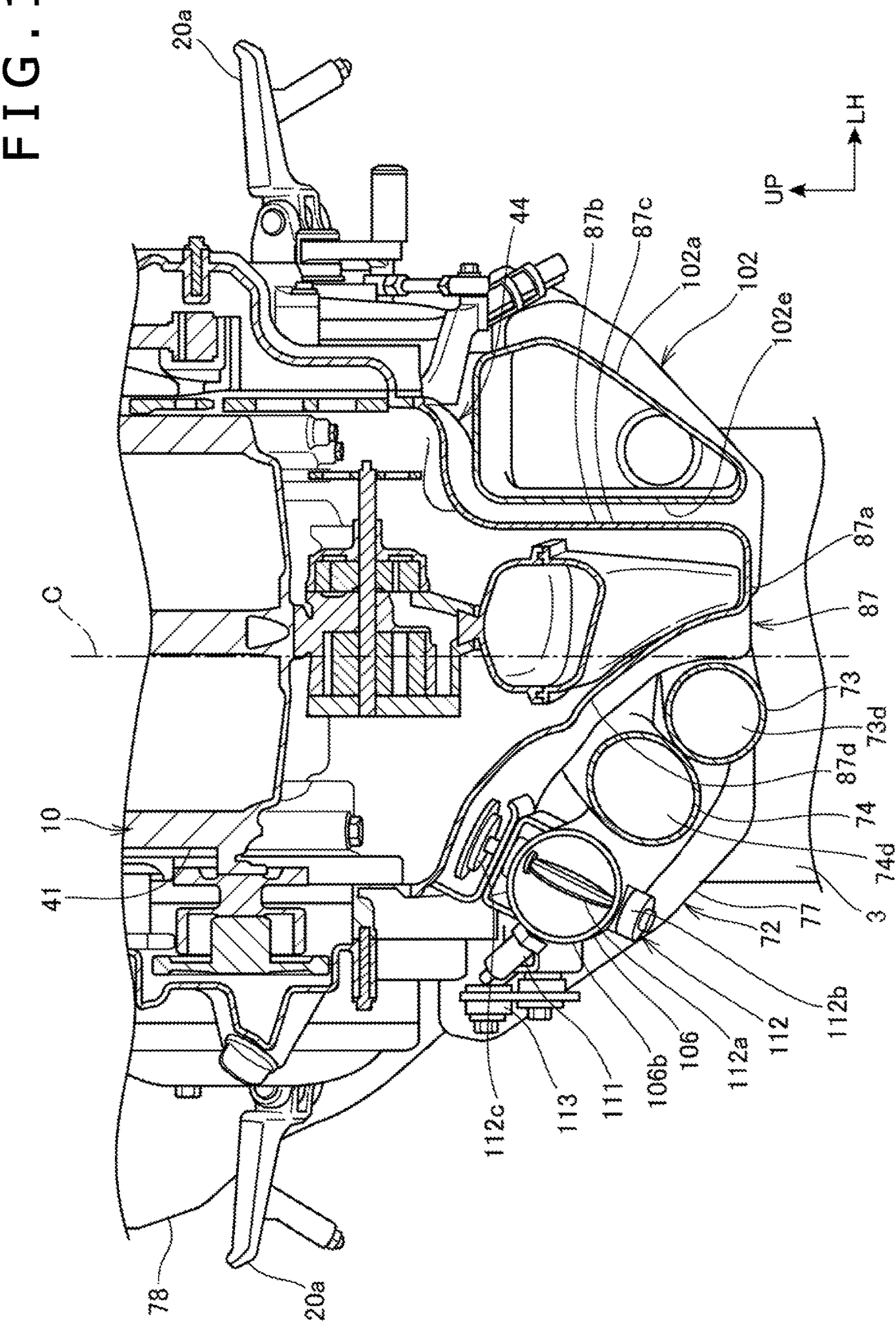
FIG. 13 is a sectional view taken along a line XIII-XIII of FIG. 1.

FIG. 10 is a plan view of portions surrounding the engine 10 as viewed from below. FIG. 11 is a right side view of portions surrounding a lower portion of the engine 10. FIG. 12 is a left side view of the portions surrounding the lower portion of the engine 10. FIG. 13 is a sectional view taken along a line XIII-XIII of FIG. 1.

Referring to FIGS. 10 to 13, the oil pan 44 is attached to the lower surface of the crankcase 41. The oil pan 44 has a bulging portion 87 bulging downward in a central portion in the vehicle width direction of the oil pan 44.

The bulging portion 87 is disposed in the rear of a front end of the crankcase 41, and is disposed in front of a rear end of the crankcase 41.

The bulging portion 87 includes: a bottom wall portion 87*a* that constitutes a bottom of the oil pan 44; and a peripheral wall portion 87*b* that extends upward from a peripheral edge of the bottom wall portion 87*a* and constitutes a side wall of the bulging portion 87. The peripheral wall portion 87*b* is formed so as to be tapered from an upper end thereof toward the bottom wall portion 87*a* side.

Specifically, the bulging portion 87 is disposed so as to be offset to the other side (left side) with respect to the vehicle center C. In addition, an other-side side wall 87*c* of the peripheral wall portion 87*b* extends upward substantially vertically, whereas a one-side side wall 87*d* of the peripheral wall portion 87*b* is inclined such that an upper side of the one-side side wall 87*d* is located more outward in the vehicle width direction.

The position of the bottom wall portion 87*a* of the oil pan 44 substantially coincides in the upward-downward direction with the position of a lower end of the link mechanism 59.

The front muffling portion 77 of the first muffler 72 of the front side exhaust device 70 is disposed below the one-side arm 30*a* of the swing arm 30 and sideward of the one side (right side) of the link mechanism 59. The front muffling portion 77 is located on the one side of the vehicle center C, and is disposed so as to be offset to the one side of the vehicle body. In addition, the front muffling portion 77 is disposed in front of the rear wheel 3 and in the rear of the engine 10.

The second muffler 102 of the rear side exhaust device 100 is disposed below the engine 10 and sideward of the other side (left side) of the bulging portion 87 of the oil pan 44. The second muffler 102 is located on the other side of the vehicle center C, and is disposed so as to be offset to the other side of the vehicle body. In addition, the second muffler 102 extends, in the forward-rearward direction, from the vicinity of the front end of the crankcase 41 to the vicinity of the link mechanism 59.

Specifically, the expansion chamber main body portion 102*a* of the second muffler 102 is disposed in front of the first muffler 72 so as not to coincide in the forward-rearward direction with the front muffling portion 77 of the first muffler 72.

Thus, the first muffler 72 of the front side exhaust device 70 of the front cylinder portion 42 and the second muffler 102 of the rear side exhaust device 100 of the rear cylinder portion 43 are arranged in positions separated from each other in the forward-rearward direction, and are also arranged so as to be separated on the left and right of the vehicle center C in the vehicle width direction. It is therefore possible to arrange the first muffler 72 and the second muffler 102 by making effectively use of front and rear arrangement spaces in the lower portion of the motorcycle 1. In addition, a left-right weight imbalance due to the mufflers can be reduced, and thus a left-right weight balance can be improved.

Referring to FIGS. 10 to 13, the rear side first exhaust pipe 103 and the rear side second exhaust pipe 104 of the rear side exhaust pipe 101 pass on the front side of the first muffler 72, and extend forward below the crankcase 41.

Specifically, the forward extending portions 103*d* and 104*d* of the rear side exhaust pipe 101 extend forward so as to pass below the crankcase 41 and on the one side of the vehicle body, merge with each other at the rear side collecting portion 105 located sideward of the one side of the bulging portion 87, and become the one rear side collecting pipe 106.

The front side bent portion 106*c* of the rear side collecting pipe 106 bends inward in the vehicle width direction. The laterally extending portion 106*d* of the rear side collecting pipe 106 extends to the other side of the vehicle body so as to pass in front of the bulging portion 87, and is connected to the second muffler 102. Specifically, the laterally extending portion 106*d* is passed between the bulging portion 87 and the lower bent portions 73*c* and 74*c* and above the rearward extending portion 73*d* and the rearward extending portion 74*d*.

The second muffler 102 extends rearward so as to pass below the crankcase 41 and on the other side of the bulging portion 87. The exhaust ports 102*d* at the rear end of the second muffler 102 open rearward at positions on the other side of the link mechanism 59.

That is, the rear side exhaust pipe 101 of the rear side exhaust device 100 extends downward from the rear cylinder portion 43, bends forward on the one side of the link mechanism 59, extends forward so as to pass below the crankcase 41 and on the one side of the vehicle body, bends to the other side of the vehicle body so as to pass in front of the bulging portion 87, and is connected to the second muffler 102. The second muffler 102 extends rearward so as to pass on the other side of the vehicle body. The exhaust ports 102*d* open on the other side of the link mechanism 59. Therefore, a long exhaust pipe length of the rear side exhaust device 100 can be secured.

As shown in FIG. 4 and FIG. 10, the side wall portion 102*e* of the expansion chamber main body portion 102*a* of the second muffler 102 has a curved surface portion 102*f* recessed along the external shape of the bulging portion 87. It is thereby possible to dispose the expansion chamber main body portion 102*a* along the bulging portion 87, and increase the capacity of the second muffler 102.

As shown in FIG. 10, FIG. 11, and FIG. 13, the exhaust valve 112 of the rear side exhaust device 100 is disposed in the rear side collecting pipe 106, and is located on the one side of the bulging portion 87. Therefore, the exhaust of the rear cylinder portion 43 having the two rear exhaust ports 53L and 53R can be controlled by the one exhaust valve 112.

The exhaust valve 112 includes: a valve body 112*a* disposed within the forward extending portion 106*b* of the rear side collecting pipe 106; a driving shaft 112*b* that rotatably supports the valve body 112*a*; and a disk-shaped driving pulley portion 112*c* connected to the driving shaft 112*b*. When the driving pulley portion 112*c* of the exhaust valve 112 is rotated by a driving source such as a motor, the valve body 112*a* rotates about the driving shaft 112*b* to open and close the pipe passage within the rear side collecting pipe 106.

As shown in FIG. 13, the driving shaft 112*b* is disposed in an inclined manner so as to be slightly tipped inward in the vehicle width direction from the vertical as viewed from the front. The driving pulley portion 112*c* is provided to an upper end portion of the driving shaft 112*b* projecting to the outside from an upper surface of the rear side collecting pipe 106. The driving pulley portion 112*c* is thus located on the upper side surface of the rear side collecting pipe 106.

Because the driving shaft 112*b* is disposed in an inclined manner, the driving pulley portion 112*c* is disposed so as to be substantially opposed to the inclined one-side side wall 87*d* of the bulging portion 87. That is, the driving pulley portion 112*c* is disposed on the upper side surface of the rear side collecting pipe 106 (exhaust pipe side surface) so as to face the oil pan 44 in the lower portion of the engine 10 from below. The driving pulley portion 112*c* can thereby be disposed compactly so as not to protrude outward or downward. Therefore, the driving pulley portion 112*c* can be disposed so as to be separated from a road surface, and a clearance between the road surface and the driving pulley portion 112*c* can be secured even in a state in which the motorcycle 1 is banked at a time of a turn.

Referring to FIGS. 10 to 13, the rearward extending portion 73*d* and the rearward extending portion 74*d* of the front side exhaust pipe 71 extend rearward on the right side of the vehicle body so as to pass below the oil pan 44. Specifically, the rearward extending portion 73*d* and the rearward extending portion 74*d* extend rearward so as to pass on the outside of the one-side side wall 87*d* of the bulging portion 87 and on the inside in the vehicle width direction of the rear side collecting pipe 106, and merge with each other at the front side collecting portion 75 in the rear of the bulging portion 87.

As shown in FIG. 13, the rear side collecting pipe 106, the rearward extending portion 74*d*, and the rearward extending portion 73*d* are arranged in a part on the side of the bulging portion 87 such that a pipe located more downward is located more inward in the vehicle width direction. Therefore, a clearance between the road surface and the exhaust pipes when the motorcycle 1 is banked can be secured.

Figure 14:
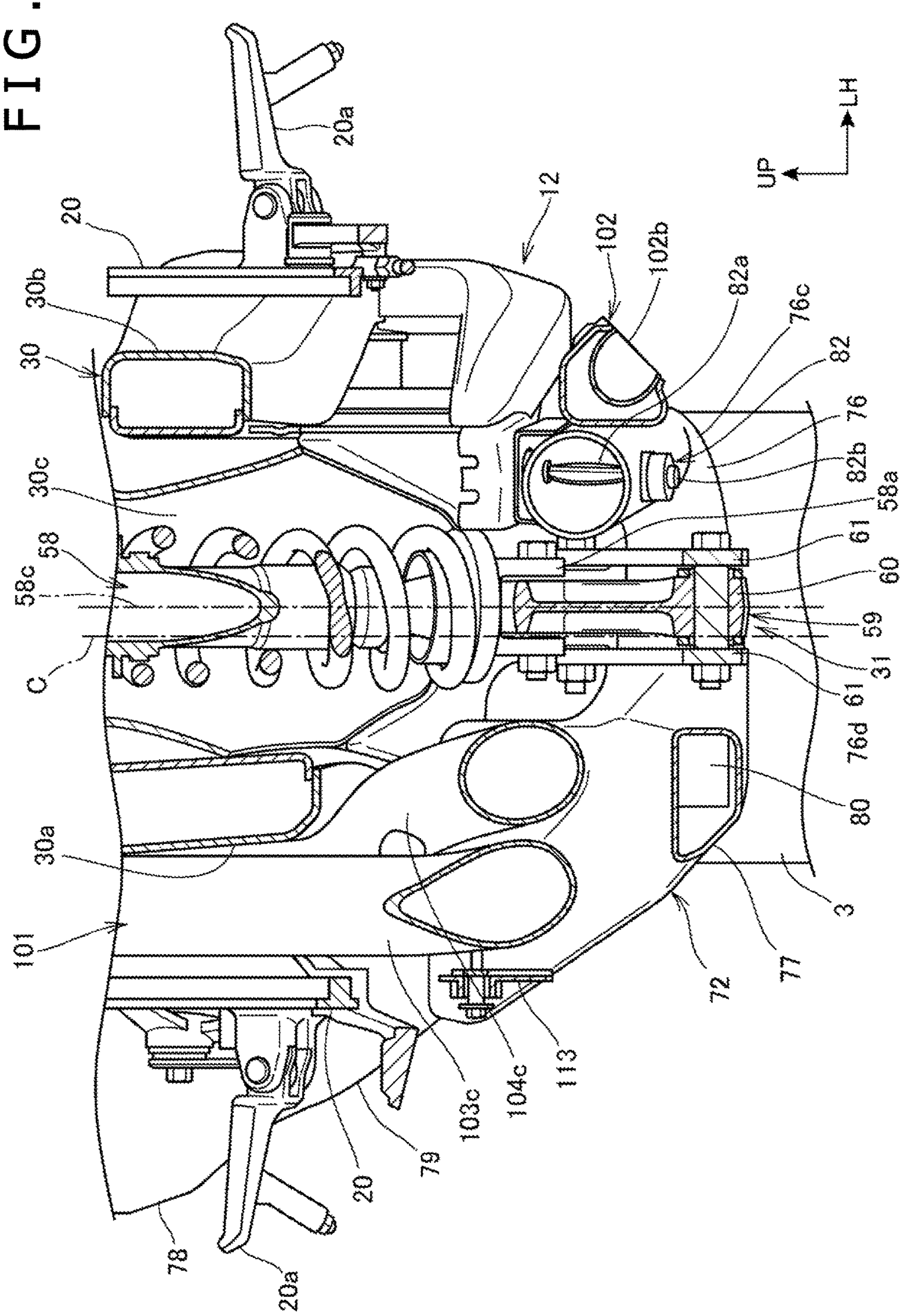
FIG. 14 is a sectional view taken along a line XIV-XIV of FIG. 2.

FIG. 14 is a sectional view taken along a line XIV-XIV of FIG. 2.

Referring to FIG. 10, FIG. 12, and FIG. 14, the front side collecting pipe 76 of the front side exhaust pipe 71 extends rearward so as to pass between the forward extending portions 103*d* and 104*d* of the rear side exhaust device 100 and the second muffler 102.

The front side collecting pipe 76 extends on the other side (left side) of the vehicle body from the front side collecting portion 75 to the rear on the other side so as to pass in front of the link mechanism 59, and then extends rearward so as to pass on the other side of the link mechanism 59.

The front side collecting pipe 76 next bends inward in the vehicle width direction at the rear bent portion 76*c* in the rear of the link mechanism 59. The linear portion 76*d* extends to the one side (right side) of the vehicle body so as to pass in the rear of the link mechanism 59, and is connected, on the one side of the vehicle body, to the front muffling portion 77 of the first muffler 72 disposed on the one side of the link mechanism 59.

That is, the front side exhaust pipe 71 of the front side exhaust device 70 extends downward from the front cylinder portion 42, extends to the one side of the vehicle body so as to cross the vehicle center C from the other side of the vehicle body, extends on the one side of the vehicle body below the crankcase 41, then bends to the other side of the vehicle body, passes on the other side of and in the rear of the link mechanism 59, and is connected to the front muffling portion 77 on the one side of the link mechanism 59. Therefore, a long exhaust pipe length of the front side exhaust device 70 can be secured.

As shown in FIG. 11 and FIG. 12, the link arms 61, 61 of the link mechanism 59 extend rearward so as to be inclined rearwardly upward as viewed from the side. The linear portion 76*d* of the front side exhaust pipe 71 extends in the vehicle width direction so as to pass through a space below rear portions of the link arms 61, 61. That is, the linear portion 76*d* extends in the vehicle width direction through the space below the side of the swing arm coupling portions 61*b*, 61*b* as an upper end side (rear end side) of the link arms 61, 61. It is therefore possible to dispose the front side exhaust pipe 71 compactly in the forward-rearward direction by making effective use of the space below the link mechanism 59.

In addition, the top wall portion 77*b* of the front muffling portion 77 of the first muffler 72 (FIG. 11) is located below the one-side arm 30*a* of the swing arm 30, and becomes closer to the undersurface of the one-side arm 30*a* when the swing arm 30 swings downward. In the present embodiment, the top wall portion 77*b* of the first muffler 72 is disposed rearwardly downward as viewed from the side such that a rear portion of the top wall portion 77*b* is lower than a front portion of the top wall portion 77*b* in accordance with a swinging angle of the swing atm 30. It is therefore possible to dispose the front muffling portion 77 compactly while securing the swinging angle of the swing arm 30.

Referring to FIG. 9, FIG. 10, FIG. 12, and FIG. 14, the exhaust valve 82 of the front side exhaust device 70 is disposed in the front side collecting pipe 76. Therefore, the exhaust of the front cylinder portion 42 having the two front exhaust ports 52L and 52R can be controlled by the one exhaust valve 82.

The exhaust valve 82 is disposed on the other side of the link mechanism 59. The exhaust valve 82 includes: a valve body 82*a* disposed within the rearward extending portion 76*b* of the front side collecting pipe 76; a driving shaft 82*b* that rotatably supports the valve body 82*a*; and a disk-shaped driving pulley portion 82*c* connected to the driving shaft 82*b*. When the driving pulley portion 82*c* of the exhaust valve 82 is rotated by a driving source such as a motor, the valve body 82*a* rotates about the driving shaft 82*b* to open and close the pipe passage within the front side collecting pipe 76.

The driving shaft 82*b* extends substantially vertically so as to be along an axis 58*c* of the suspension 58 (FIG. 14) as viewed from the front. The driving pulley portion 82*c* is provided to an upper end portion of the driving shaft 82*b* projecting to the outside from an upper surface of the front side collecting pipe 76. The driving pulley portion 82*c* is therefore located on the upper side surface of the front side collecting pipe 76. When the driving shaft 82*b* is thus disposed substantially vertically, the exhaust valve 82 can be made compact in the vehicle width direction. The exhaust valve 82 can therefore be disposed on the side of the link mechanism 59.

In addition, as shown in FIG. 12, the rearward extending portion 76*b* is disposed rearwardly downward so as to be along the undersurface of the one-side arm 30*a*. The driving shaft 82*b* is inclined rearward from the vertical as viewed from the side. The driving pulley portion 82*c* is disposed rearwardly downward so as to be along the undersurface of the one-side arm 30*a*. A large clearance can therefore be secured between the one-side arm 30*a* and the driving pulley portion 82*c*.

Referring to FIG. 2, FIG. 9, and FIG. 10, the exhaust gas sensor 81 of the front side exhaust device 70 is disposed on the rearward extending portion 76*b* of the front side collecting pipe 76 in a position below the swing arm 30, and is located between the front side collecting pipe 76 and the forward extending portion 104*d* of the rear side second exhaust pipe 104.

The exhaust gas sensor 81 obliquely extends upwardly outward in the vehicle width direction toward the forward extending portion 104*d* side as viewed from the front.

The exhaust gas sensor 81 is disposed immediately in front of the link mechanism 59, and overlaps the link mechanism 59 as viewed from the front. It is therefore possible to dispose the exhaust gas sensor 81 compactly by using a space below the swing arm 30 and in front of the link mechanism 59.

Referring to FIG. 10 to FIG. 12 and FIG. 14, the front side exhaust device 70 is disposed so as to surround the link mechanism 59 with the exhaust gas sensor 81, the exhaust valve 82, the linear portion 76*d*, and the front muffling portion 77 from the periphery of the link mechanism 59. Therefore, the exhaust gas sensor 81, the exhaust valve 82, the linear portion 76*d*, and the front muffling portion 77 can be arranged compactly by using a space around the periphery of the link mechanism 59. In addition, the front side exhaust pipe 71 can be disposed so as to surround the link mechanism 59, so that a long exhaust pipe length can be secured.

As shown in FIG. 10, the front side collecting portion 75 of the front side exhaust device 70 is located below the crankcase 41 and on an opposite side of the bulging portion 87 from the second muffler 102, and is located in front of the front muffling portion 77. Therefore, the front side collecting portion 75 can be disposed below the crankcase 41 and in a position different from those of the second muffler 102 and the front muffling portion 77. The front side exhaust device 70 can thus be disposed by making effective use of a space below the crankcase 41.

In addition, below the crankcase 41, the front side exhaust pipe 71 extends rearward from the front side, and the rear side exhaust pipe 101 extends from the rear side to the front side. The front side exhaust pipe 71 and the rear side exhaust pipe 101 thus extend in the forward-rearward direction so as to run in directions counter to each other below the crankcase 41.

Specifically, the front side collecting portion 75 of the front side exhaust pipe 71 is located in the rear of the rear side collecting portion 105 of the rear side exhaust pipe 101, and is arranged side by side with the forward extending portions 103*d* and 104*d* of the rear side exhaust pipe 101 in the vehicle width direction.

In addition, the rear side collecting portion 105 of the rear side exhaust pipe 101 is located in front of the front side collecting portion 75 of the front side exhaust pipe 71, and is arranged side by side with the rearward extending portions 73*d* and 74*d* of the front side exhaust pipe 71 in the vehicle width direction.

That is, the front side collecting portion 75 and the rear side collecting portion 105 are disposed so as to be longitudinally displaced from each other below the crankcase 41. Therefore, the front side collecting portion 75 and the rear side collecting portion 105 of the front side exhaust pipe 71 and the rear side exhaust pipe 101 extended from the front cylinder portion 42 and the rear cylinder portion 43 independently of each other can be arranged compactly below the crankcase 41.

In a conventionally known exhaust device structure for a rocking vehicle, the exhaust device structure including an exhaust pipe and a muffler, the muffler is extended rearward from below an internal combustion engine or is disposed in an upper space on a side of a swing arm as a suspension device such that a clearance of the muffler from a road surface can be secured even when the vehicle banks (see for example Japanese Patent Laid-Open No. 1990-271024).

In the exhaust device structure as described above, depending on the position of an exhaust port of the internal combustion engine, a distance from the exhaust port to the muffler becomes short, and thus it becomes difficult to secure an exhaust pipe length from the exhaust port to the muffler. In addition, it is desirable to be able to dispose the muffler while securing clearances of the muffler from the road surface and the suspension device.

The present invention has been made in view of the above-described circumstances. It is an object of the present invention to be able to secure an exhaust pipe length from an exhaust port to a muffler in an exhaust device structure for a rocking vehicle, and to be able to dispose the muffler while securing clearances of the muffler from a road surface and a suspension device.

As described above, according to an embodiment to which the present invention is applied, an exhaust device structure for a motorcycle 1 includes: an engine 10 disposed between a front wheel 2 and a rear wheel 3, and mounted in a vehicle body frame F; a front side exhaust device 70 that muffles exhaust gas noise from the engine 10; and a suspension device 12 that swingably supports the rear wheel 3; the front side exhaust device 70 including a front side exhaust pipe 71 having an upstream end connected to front exhaust ports 52L and 52R of the engine 10 and a first muffler 72 connected to a downstream end of the front side exhaust pipe 71, the suspension device 12 including a swing arm 30 that swingably supports the rear wheel 3 and a cushion device 31 that cushions swinging of the swing arm 30, the first muffler 72 being disposed below the swing arm 30 and on one side of the cushion device 31, the front side exhaust pipe 71 extending from a front side of the first muffler 72, bending so as to pass in a rear of the cushion device 31 from another side of the cushion device 31, and being connected to the first muffler 72. Thus, because the first muffler 72 is disposed below the swing arm 30 and on the one side of the cushion device 31, a clearance between the first muffler 72 and the cushion device 31 of the suspension device 12 can be secured. Further, because the first muffler 72 can be disposed in a low position of the vehicle body and on a central side in the vehicle width direction, a clearance between the first muffler 72 and the road surface can be secured even when the motorcycle 1 banks. In addition, because the front side exhaust pipe 71 extends from the front side of the first muffler 72, bends so as to pass in the rear of the cushion device 31 from the other side of the cushion device 31, and is connected to the first muffler 72, an exhaust pipe length from the front exhaust ports 52L and 52R to the first muffler 72 can be lengthened.

In addition, the cushion device 31 includes a suspension 58 and a link mechanism 59 that is connected to the suspension 58 and located below an undersurface of the swing arm 30. The first muffler 72 is disposed on a side of the link mechanism 59. The link mechanism 59 in the cushion device 31 is a part less susceptible to heat than the suspension 58. The first muffler 72 can thus be disposed close to the link mechanism 59. Therefore, the first muffler 72 can be disposed compactly.

In addition, the link mechanism 59 is disposed so as to be inclined in an oblique direction as viewed from the side, and the front side exhaust pipe 71 passes below an upper end side of link arms 61, 61 of the link mechanism 59 and is connected to the first muffler 72. It is therefore possible to dispose the front side exhaust pipe 71 compactly in the forward-rearward direction by making effective use of a space below the link mechanism 59.

Further, the front side exhaust pipe 71 includes a rear bent portion 76*c* that bends so as to pass in the rear of the cushion device 31 from the other side of the cushion device 31, and a linear portion 76*d* that linearly extends in a left-right direction of the vehicle from an end of the rear bent portion 76*c*. A catalytic device 80 is disposed within the linear portion 76*d*. Thus, the catalytic device 80 can be disposed by using the linear portion 76*d* passing in the rear of the cushion device 31, and there is no need to provide a linear pipe for disposing the catalytic device 80 in the forward-rearward direction. A longitudinal length of the front side exhaust pipe 71 can therefore be made compact.

In addition, an exhaust gas sensor 81 is provided to the front side exhaust pipe 71, and the exhaust gas sensor 81 is disposed immediately in front of the cushion device 31. Therefore, the exhaust gas sensor 81 can be disposed compactly by using a space below the swing arm 30 and in front of the cushion device 31.

In addition, the front side exhaust pipe 71 has an exhaust valve 82 that controls opening and closing of an exhaust pipe passage of the front side exhaust pipe 71, the exhaust valve 82 being disposed in the front side exhaust pipe 71 and in a position on a side of the link mechanism 59. A driving shaft 82*b* as a center of rotation of the exhaust valve 82 is disposed so as to be along a direction of an axis 58*c* of the cushion device 31 as viewed from the front. Therefore, the exhaust valve 82 can be made compact in the vehicle width direction, and the exhaust valve 82 can be disposed compactly in the position on the side of the link mechanism 59.

In addition, as viewed from a bottom portion of the vehicle as in FIG. 10, the front side exhaust pipe 71 is wound around a periphery of the cushion device 31 so as to surround the cushion device 31 with the exhaust gas sensor 81, the linear portion 76*d*, and the exhaust valve 82, and a side on the one side of the cushion device 31 is covered by the first muffler 72. Thus, the exhaust gas sensor 81, the linear portion 76*d* in which the catalytic device 80 is disposed, the exhaust valve 82, and the first muffler 72 can be disposed compactly so as to surround the periphery of the cushion device 31.

Further, as viewed from the side of the vehicle, a top wall portion 77*b* of the first muffler 72 is inclined such that a rear portion of the top wall portion 77*b* is lower than a front portion of the top wall portion 77*b* in accordance with a swinging angle of the swing arm 30. It is therefore possible to dispose the first muffler 72 compactly while securing the swinging angle of the swing arm 30.

In addition, according to an embodiment to which the present invention is applied, an exhaust device structure for a motorcycle 1 includes: an engine 10 mounted between a front wheel 2 and a rear wheel 3; and a front side exhaust device 70 and a rear side exhaust device 100 that muffle exhaust gas noise from the engine 10; the front side exhaust device 70 and the rear side exhaust device 100 including a front side exhaust pipe 71 and a rear side exhaust pipe 101 having upstream ends connected to front exhaust ports 52L and 52R and rear exhaust ports 53L and 53R of the engine 10 and a first muffler 72 and a second muffler 102 as a plurality of expansion chambers connected to downstream ends of the front side exhaust pipe 71 and the rear side exhaust pipe 101, the first muffler 72 and the second muffler 102 being disposed on a lower side of the motorcycle 1, the first muffler 72 and the second muffler 102 being arranged so as to be separated from each other in a forward-rearward direction, and the first muffler 72 and the second muffler 102 being arranged so as to be separated from each other in a left-right direction with respect to a vehicle center C as a center of the vehicle. Thus, because the plurality of expansion chambers are separated from each other in the forward-rearward direction of the vehicle, and are arranged so as to be separated from each other in the left-right direction with respect to the vehicle center, the first muffler 72 and the second muffler 102 can be arranged by making effective use of a front space and a rear space, and a left-right weight balance of the motorcycle 1 can be improved even in the constitution in which the first muffler 72 and the second muffler 102 are arranged so as to be offset in the vehicle width direction.

In addition, the front side exhaust pipe 71 and the rear side exhaust pipe 101 of the front side exhaust device 70 and the rear side exhaust device 100 are exhaust pipes independent of each other, and the first muffler 72 and the second muffler 102 are mufflers arranged separately for the front side exhaust pipe 71 and the rear side exhaust pipe 101 that are independent of each other. Thus, because the front side exhaust pipe 71 and the rear side exhaust pipe 101 are independent of each other, there is a high degree of freedom of arrangement of the exhaust pipes, and the first muffler 72 and the second muffler 102 are easily arranged so as to be separated from each other in the left-right direction with respect to the vehicle center C. In addition, because the expansion chambers are the first muffler 72 and the second muffler 102 that are heavy in weight, a left-right weight balance can be improved effectively by arranging the first muffler 72 and the second muffler 102 so as to be separated from each other in the left-right direction.

In addition, the second muffler 102 is disposed below the engine 10, and the first muffler 72 is disposed below the swing arm 30 by which the rear wheel 3 is swingably supported from the vehicle body frame F. Thus, the second muffler 102 and the first muffler 72 can be arranged so as to be separated from each other longitudinally and laterally by making effective use of a space below the engine 10 and a space below the swing arm 30.

Further, the second muffler 102 disposed below the engine 10 is disposed on the other side so as to avoid an oil pan 44 that bulges from a lower portion of the engine 10, the front side exhaust pipe 71 of the first muffler 72 is disposed so as to pass on the one side of the oil pan 44, and a side surface of the second muffler 102 which side surface is on the oil pan 44 side has a curved surface portion 102*f* along a side surface of the bulging portion 87 of the oil pan 44. It is thus possible to divide a space below the engine 10 into spaces for arranging the second muffler 102 on the other side of the oil pan 44 and the front side exhaust pipe 71 on the one side of the oil pan 44, and increase the capacity of the second muffler 102. In addition, because the second muffler 102 has the curved surface portion 102*f* along the side surface of the bulging portion 87 of the oil pan 44, the capacity of the second muffler 102 can be increased.

In addition, an exhaust valve 112 that controls opening and closing of an exhaust pipe passage of the rear side exhaust pipe 101 is disposed in the rear side exhaust pipe 101 located in front of the first muffler 72 and below the engine 10, and a driving pulley portion 112*c* that drives the exhaust valve 112 is disposed on an exhaust pipe side surface facing the engine 10. Thus, the driving pulley portion 112*c* can be disposed outward and downward compactly, and a clearance between the exhaust valve 112 and the road surface can be secured.

In addition, the engine 10 is a V-type internal combustion engine in which a front cylinder portion 42 and a rear cylinder portion 43 forming a pair are arranged so as to be longitudinally aligned with each other in a V-shape, and the first muffler 72 and the second muffler 102 are arranged separately for the front side exhaust pipe 71 and the rear side exhaust pipe 101 that are connected to the front cylinder portion 42 and the rear cylinder portion 43 independently of each other. Because the front side exhaust pipe 71 and the rear side exhaust pipe 101 are connected to the front cylinder portion 42 and the rear cylinder portion 43 of the V-type internal combustion engine independently of each other, there is a high degree of freedom of arrangement of the exhaust pipes, and the second muffler 102 and the first muffler 72 provided for the exhaust pipes are easily arranged so as to be separated from each other in the left-right direction with respect to the vehicle center C. In addition, the first muffler 72 and the second muffler 102 can be efficiently arranged apart from each other longitudinally so as to correspond to the positions of the front cylinder portion 42 and the rear cylinder portion 43 that are aligned with each other longitudinally, and exhaust pipe lengths can be secured in a well-balanced manner.

In addition, the engine 10 has a plurality of parallel cylinders in the front cylinder portion 42, and a front side collecting portion 75 into which a front side first exhaust pipe 73 and a front side second exhaust pipe 74 extending from the respective cylinders merge is disposed below the engine 10, near to an opposite side of the oil pan 44 from the second muffler 102, and in front of the first muffler 72. Thus, the front side collecting portion 75 of the front side exhaust pipe 71 can be disposed below the engine 10 and in positions different from those of the second muffler 102 and the first muffler 72, and the front side exhaust pipe 71 can be disposed by making effective use of a space below the engine 10.

Further, the engine 10 has a plurality of parallel cylinders in the front cylinder portion 42, and has a plurality of parallel cylinders in the rear cylinder portion 43, a front side collecting portion 75 is provided into which a front side first exhaust pipe 73 and a front side second exhaust pipe 74 extending from the respective cylinders of the front cylinder portion 42 merge, a rear side collecting portion 105 is provided into which a rear side first exhaust pipe 103 and a rear side second exhaust pipe 104 extending from the respective cylinders of the rear cylinder portion 43 merge, the front side exhaust pipe 71 and the rear side exhaust pipe 101 extending from the front cylinder portion 42 and the rear cylinder portion 43 extend in directions counter to each other below the engine 10, and the front side collecting portion 75 and the rear side collecting portion 105 are arranged so as to be longitudinally displaced from each other below the engine 10 and do not overlap each other longitudinally. Thus, the front side collecting portion 75 and the rear side collecting portion 105 of the front side exhaust pipe 71 and the rear side exhaust pipe 101 as the plurality of exhaust pipes extended from the front and rear cylinder portions 42 and 43, respectively, can be arranged compactly in a space below the engine 10.

It is to be noted that the foregoing embodiment represents one mode to which the present invention is applied, and that the present invention is not limited to the foregoing embodiment.

The foregoing embodiment has been described supposing that the first muffler 72 and the second muffler 102 are arranged separately for the front side exhaust pipe 71 and the rear side exhaust pipe 101 that are connected to the front cylinder portion 42 and the rear cylinder portion 43 independently of each other. However, the present invention is not limited to this. For example, a single exhaust pipe extending from a cylinder portion may have a plurality of mufflers, and these mufflers may be arranged so as to be separated from each other in the forward-rearward direction and separated from each other in the left-right direction with respect to the vehicle center C.

In addition, the foregoing embodiment has been described by taking the motorcycle 1 as an example of a rocking vehicle. However, the present invention is not limited to this. For example, the present invention may be applied to three-wheeled saddle riding type vehicles having two front wheels or two rear wheels or rocking vehicles having four wheels or more.

DESCRIPTION OF REFERENCE SYMBOLS

1 Motorcycle (rocking vehicle)
2 Front wheel
3 Rear wheel
10 Engine (internal combustion engine, V-type internal combustion engine)
12 Suspension device
30 Swing arm
31 Cushion device
42 Front cylinder portion (cylinder portion)
43 Rear cylinder portion (cylinder portion)
44 Oil pan
52L, 52R Front exhaust port (exhaust port)
53L, 53R Rear exhaust port (exhaust port)
58 Suspension
58*c* Axis
59 Link mechanism
61, 61 Link arm
70 Front side exhaust device (exhaust device)
71 Front side exhaust pipe (exhaust pipe)
72 First muffler (expansion chamber, rear side muffler)

75 Front side collecting portion (collecting portion)
76*d* Linear portion
77*b* Top wall portion (top surface)
80 Catalytic device
81 Exhaust gas sensor
82 Exhaust valve
82*b* Driving shaft
87 Bulging portion
100 Rear side exhaust device (exhaust device)
101 Rear side exhaust pipe (exhaust pipe)
102 Second muffler (expansion chamber, front side muffler)
102*f* Curved surface portion
105 Rear side collecting portion (collecting portion)
112 Exhaust valve
112*c* Driving pulley portion
C Vehicle center
F Vehicle body frame

The invention claimed is:

1. An exhaust device structure for a vehicle having a front wheel and a rear wheel, the exhaust device structure comprising:

an internal combustion engine mounted between the front wheel and the rear wheel; and an exhaust device that muffles exhaust gas noise from the internal combustion engine, the exhaust device including an exhaust pipe having an upstream end connected to an exhaust port of the internal combustion engine and an expansion chamber connected to a downstream end of the exhaust pipe, and the expansion chamber including a first muffler and a second muffler separated from each other in a forward-rearward direction of the vehicle, and the first muffler and the second muffler being arranged so as to be separated from each other in a left-right direction with respect to a vehicle center, wherein an exhaust port of the first muffler and an exhaust port of the second muffler are separated from each other in the forward-rearward direction of the vehicle, and the exhaust port of the first muffler and the exhaust port of the second muffler are separated from each other in an up-and-down direction of the vehicle perpendicular to both the forward-rearward direction and the left-right direction, the exhaust pipe of the exhaust device is formed by an exhaust pipe of the first muffler and an exhaust pipe of the second muffler independent of each other, the exhaust port of the internal combustion engine comprises a first exhaust port to which the exhaust pipe of the first muffler directly is connected and a second exhaust port to which the exhaust pipe of the second muffler is directly connected, and a first exhaust pipe passage comprising the exhaust pipe of the first muffler and the first muffler is independent from a second exhaust pipe passage comprising the exhaust pipe of the second muffler and the second muffler.

2. The exhaust device structure for the vehicle according to claim 1, wherein the first muffler disposed towards a front of the vehicle in the forward-rearward direction of the vehicle is disposed below the internal combustion engine, and the second muffler disposed towards a rear of the vehicle in the forward-rearward direction of the vehicle is disposed below a swing arm by which the rear wheel is swingably supported from a vehicle body frame.

3. The exhaust device structure for the vehicle according to claim 2, wherein the vehicle includes an oil pan that bulges from a lower portion of the internal combustion engine, the first muffler disposed below the internal combustion engine is disposed on an other side so as to avoid the oil pan that bulges from a lower portion of the internal combustion engine, and the exhaust pipe of the second muffler is disposed so as to pass on one side of the oil pan, and a side surface of the first muffler, the side surface being on a side of the oil pan, has a curved surface portion along a side surface of a bulging portion of the oil pan.

4. The exhaust device structure for the vehicle according to claim 3, wherein an exhaust valve that controls opening and closing of the first exhaust pipe passage of the exhaust pipe of the first muffler is disposed in the exhaust pipe of the first muffler located in front of the second muffler and below the internal combustion engine, and a driving pulley portion that drives the exhaust valve is disposed on an exhaust pipe side surface facing the internal combustion engine.

5. The exhaust device structure for the vehicle according to claim 2, wherein the internal combustion engine is a V-type internal combustion engine in which cylinder portions forming a pair are arranged so as to be longitudinally aligned with each other in a V-shape, and the first muffler and the second muffler are arranged separately for the exhaust pipe of the first muffler and the exhaust pipe of the second muffler connected to the respective cylinder portions independently of each other, and the first muffler being connected to one of the pair of cylinder portions via the exhaust pipe of the first muffler, and the second muffler being connected to the other of the pair of cylinder portions via the exhaust pipe of the second muffler.

6. The exhaust device structure for the vehicle according to claim 5, wherein the V-type internal combustion engine has a plurality of parallel cylinders in one cylinder portion, and a collecting portion into which a plurality of exhaust pipe portions of the exhaust pipe of the first muffler extending from the respective cylinders merge is disposed below the V-type internal combustion engine, near to an opposite side of the oil pan from the first muffler, and in front of the second muffler.

7. The exhaust device structure for the vehicle according to claim 5, wherein the V-type internal combustion engine has a plurality of parallel cylinders in each of the cylinder portions, collecting portions into which a plurality of exhaust pipe portions of each of the exhaust pipe of the first muffler and the exhaust pipe of the second muffler extending from the respective cylinders merge are disposed for the respective cylinder portions, and the exhaust pipes of the first and second mufflers extending from the respective cylinder portions extend in directions counter to each other below the V-type internal combustion engine, and the collecting portions are arranged so as to be longitudinally displaced from each other below the V-type internal combustion engine and do not overlap each other longitudinally.

8. The exhaust device structure for the vehicle according to claim 1, wherein the vehicle includes a vehicle body frame in which the internal combustion engine is mounted and a suspension device that swingably supports the rear wheel are provided, the suspension device includes a swing arm that swingably supports the rear wheel and a cushion device that cushions swinging of the swing arm, the first muffler is disposed below the swing arm and on one side of the cushion device, and the exhaust pipe of the first muffler extends from the exhaust port of the internal combustion engine at a front side of the first muffler, bends so as to pass behind the cushion device from an other side of the cushion device, and is connected to the first muffler.

9. The exhaust device structure for the vehicle according to claim 8, wherein the cushion device includes a suspension and a link mechanism that is connected to the suspension and located below an undersurface of the swing arm, and the first muffler is disposed on a side of the link mechanism.

10. The exhaust device structure for the vehicle according to claim 9, wherein the link mechanism is disposed so as to be inclined in an oblique direction as viewed from a side, and the exhaust pipe of the first muffler passes below an upper end side of link arms of the link mechanism and is connected to the first muffler.

11. The exhaust device structure for the vehicle according to claim 8, wherein the exhaust pipe of the first muffler includes a rear bent portion that bends so as to pass behind the cushion device from the other side of the cushion device and a linear portion that linearly extends in the left-right direction of the vehicle from an end of the rear bent portion, and a catalytic device is disposed within the linear portion.

12. The exhaust device structure for the vehicle according to claim 8, wherein the exhaust pipe of the first muffler has an exhaust gas sensor, and the exhaust gas sensor is disposed immediately in front of the cushion device.

13. The exhaust device structure for the vehicle according to claim 9, wherein the exhaust pipe of the first muffler has an exhaust valve that controls opening and closing of the first exhaust pipe passage of the exhaust pipe of the first muffler, the exhaust valve being disposed in the exhaust pipe of the first muffler and in a position on a side of the link mechanism, and a driving shaft as a center of rotation of the exhaust valve is disposed so as to be along a direction of an axis of the cushion device as viewed from a front.

14. The exhaust device structure for the vehicle according to claim 9, wherein the exhaust pipe of the first muffler includes a rear bent portion that bends so as to pass behind the cushion device from the other side of the cushion device and a linear portion that linearly extends in the left-right direction of the vehicle from an end of the rear bent portion, and a catalytic device is disposed within the linear portion, the exhaust pipe of the first muffler has an exhaust gas sensor, and the exhaust gas sensor is disposed immediately in front of the cushion device, the exhaust pipe of the first muffler has an exhaust valve that controls opening and closing of the first exhaust pipe passage of the exhaust pipe of the first muffler, the exhaust valve being disposed in the exhaust pipe of the first muffler and in a position on a side of the link mechanism, and a driving shaft as a center of rotation of the exhaust valve is disposed so as to be along a direction of an axis of the cushion device as viewed from a front, as viewed from a vehicle bottom portion of the vehicle, the exhaust pipe of the first muffler is wound around a periphery of the cushion device so as to surround the cushion device with the exhaust gas sensor, the linear portion, and the exhaust valve, and a side of the cushion device is covered by the first muffler.

15. The exhaust device structure for the vehicle according to claim 8, wherein as viewed from a side of the vehicle, a top surface of the first muffler is inclined such that a portion of the top surface towards a rear of the vehicle is lower than a portion of the top surface towards a front of the vehicle in accordance with a swinging angle of the swing arm.

* * * * *